(12) United States Patent
Ben Tzvi

(10) Patent No.: US 8,503,762 B2
(45) Date of Patent: Aug. 6, 2013

(54) PROJECTING LOCATION BASED ELEMENTS OVER A HEADS UP DISPLAY

(75) Inventor: Jacob Ben Tzvi, Tel Aviv (IL)

(73) Assignee: Jacob Ben Tzvi, Bnei Zion (IL)

( * ) Notice: Subject to any disclaimer, the term of this patent is extended or adjusted under 35 U.S.C. 154(b) by 302 days.

(21) Appl. No.: 12/791,207

(22) Filed: Jun. 1, 2010

(65) Prior Publication Data
US 2011/0052042 A1 Mar. 3, 2011

Related U.S. Application Data

(60) Provisional application No. 61/275,041, filed on Aug. 26, 2009.

(51) Int. Cl.
*G06K 9/00* (2006.01)
(52) U.S. Cl.
USPC ............................................................ 382/154
(58) Field of Classification Search
USPC ............................................ 345/7–9; 382/154
See application file for complete search history.

(56) References Cited

U.S. PATENT DOCUMENTS

| | | | |
|---|---|---|---|
| 6,285,317 B1 * | 9/2001 | Ong ........................ 342/357.57 |
| 7,579,939 B2 * | 8/2009 | Schofield et al. .......... 340/425.5 |
| 7,733,244 B2 * | 6/2010 | Asada ........................ 340/995.1 |
| 7,783,422 B2 * | 8/2010 | Tanaka ....................... 701/436 |
| 8,035,493 B2 * | 10/2011 | Hioki ........................ 340/425.5 |
| 2006/0271284 A1 * | 11/2006 | Watanabe et al. .......... 701/209 |
| 2009/0140845 A1 * | 6/2009 | Hioki ........................ 340/425.5 |
| 2009/0177383 A1 * | 7/2009 | Tertoolen .................... 701/208 |
| 2010/0131197 A1 * | 5/2010 | Zhang et al. ................ 701/209 |
| 2010/0292886 A1 * | 11/2010 | Szczerba et al. ............. 701/29 |

OTHER PUBLICATIONS (SeungJun Kim, "Simulated Augmnted reality Windshield Display as a Cognitive Mapping Aid for Elder Driver Navigation", ACM, 2009, publised in Proc. CHI 2009).*

* cited by examiner

*Primary Examiner* — Samir Ahmed
*Assistant Examiner* — Totam Le
(74) *Attorney, Agent, or Firm* — D. Kligler I.P. Services Ltd

(57) ABSTRACT

Methods and systems for projecting a location based elements over a heads up display. One method includes: generating a three dimensional (3D) model of a scene, based on a source of digital mapping of the scene; associating a position of at least one selected LAE contained within the scene, with a respective position in the 3D model; superimposing the projecting onto a specified position on a transparent screen facing a viewer and associated with the vehicle, at least one graphic indicator associated with the at least one LAE, wherein the specified position is calculated based on: the respective position of the LAE in the 3D model, the screen's geometrical and optical properties, the viewer's viewing angle, the viewer's distance from the screen, the vehicle's position and angle within the scene, such that the viewer, the graphic indicator, and the LAE are substantially on a common line.

23 Claims, 21 Drawing Sheets

US 8,503,762 B2

PROJECTING LOCATION BASED ELEMENTS OVER A HEADS UP DISPLAY

CROSS REFERENCE TO RELATED APPLICATIONS

This application claims the benefit of U.S. Provisional Patent Application 61/275,041 filed on Aug. 26, 2009, which is incorporated herein by reference.

BACKGROUND

1. Technical Field

The present invention relates to the field of displays, and more particularly, to projecting location based elements over a heads up display 2. Discussion of Related Art Several types of applications which use heads up display (HUD) devices for navigation are currently available either commercially or under development. Such devices usually project elements of interest upon a transparent surface such as windshield. Existing technology tend to provide projection of elements upon the transparent surface along a line of sight drawn between the user and the respective element in reality.

BRIEF SUMMARY

According to one aspect of the invention there is provided a method that includes: generating a three dimensional (3D) model of a scene within a specified radius from a vehicle, based on a digital mapping source digital mapping source of the scene; associating a position of at least one selected location aware entity (LAE) contained within the scene, with a respective position in the 3D model; superimposing the LAE from the 3D model onto a predefined 2D virtual formation of the screen, wherein the superimposing is usable for projecting onto a specified position on a transparent screen facing a viewer and associated with the vehicle, at least one graphic representation of the LAE, wherein the specified position is calculated based on: the respective position of the LAE in the 3D model, the screen's geometrical and optical properties, the viewer's viewing angle, the viewer's distance from the screen, the vehicle's position and angle within the scenery, such that the viewer, the graphic indicator, and the LAE are substantially on a common line.

According to another aspect of the invention there is provided a system that includes a processor and a projector. The processor may be configured to generate a three dimensional (3D) model of a scene within a specified radius from a vehicle, based on a digital mapping source of the scene and associate a position of at least one selected LAE extracted from the source of digital mapping contained within the scene, with a respective position in the 3D model. The projector may be configured to project onto a specified position on a transparent screen facing a viewer and associated with the vehicle, at least one graphic indicator associated with the at least one LAE, wherein the specified position is calculated by the processor based on: the respective position of the LAE in the 3D model, the screen's geometrical and optical properties, the viewer's viewing angle, the viewer's distance from the screen, the vehicle's position and angle within the scenery, such that the viewer, the graphic indicator, and the LAE are substantially on a common line.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
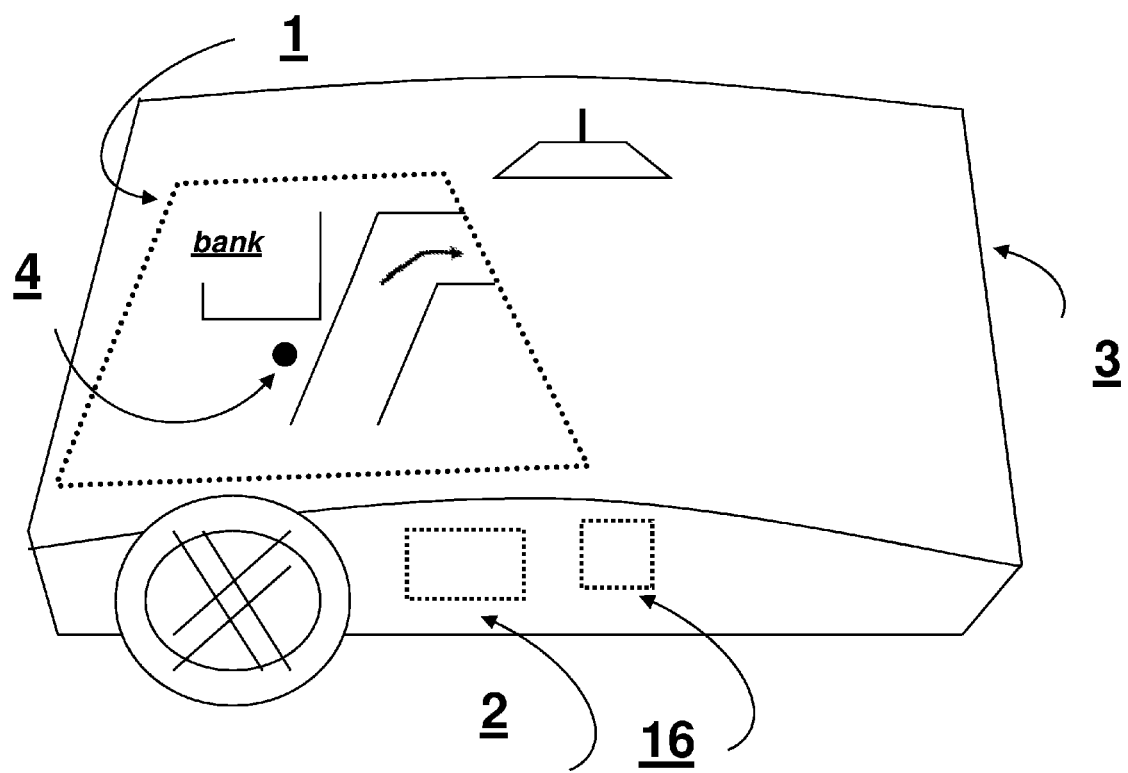
FIG. 1 shows an example for a specified area on the windshield, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner: The term "Dynamic Directional Arrows" (DDA) as used herein in this application, is defined as visual guiding means that conveys navigation clues. The term "Location-Aware Entities (or Elements)" (LAE) as used herein in this application, is defined as any indicators of geospatial data that may be presented on a display. LAE's may comprise DDA's to the driver, indicative geometrical shapes and navigation elements. Further examples are presented in the text below.

A method and implementing apparatus for displaying location-aware and navigation guidance intended for ground mobile platform is described, the purpose of which is to display location aware entities such as LAE of interest and directional symbol on the windshield as a function of digital mapping extraction and analysis with the directional information obtained from a navigation device. Such digital mapping might be stored in vehicle or exterior geospatial data sources. Location aware entities are superimposed over the estimated location of the real object in front of vehicle surroundings (or scene). The display considers real object visibility and occlusions and resizing policies. Dynamic directional arrows are also displayed when a turn off become visible. The arrow is superimposed after terrain and surface analyses are performed to facilitate optimum display. The arrow illustrates the turn direction, rotation angle and slopes. The arrow is also superimposed as a function of distance according to chosen perspective policies. The heads up display device which the apparatus has connection with has the means to display the location aware entities and directional symbol in the region of display of the vehicle windshield.

The illustrative embodiment involves the use of the invention in ground motor vehicle context thus for consistency and keeping the description simple, the term "driver" is principally used when referring to the human user of the apparatus to whom the LAE and DDA is displayed. However, as noted above, the invention is potentially useful in other non motor, vehicular applications for which the "user" may not be a driver. Moreover, some operations that may be performed during the use of disclosed apparatus, such as "adjusting parameters, "downloading/updating mapping material" or "calibrating/configuring", may be carried out in a motor-vehicular application but not by a person who is then driving the vehicle and/or may be performed outside of the vehicle altogether. Thus the term "driver" is used herein only for illustrative purpose and is not intended to mean that the invention is limited to motor vehicle applications or to use by a person whom one would call a "driver" The use of so Called head-up display makes it possible to provide the driver with location-based information within his field of vision. According to the present invention, therefore, combining head-up display together with navigation device and digital mapping material would facilitate displaying geospatial data such as LAE objects (Location Aware Elements) and DDA over the vehicle windshield. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The embodiments of the invention described herein are largely in the context of motor vehicles operation employing so called heads up display over vehicle windshield. However, the invention is applicable to other mobile platforms—non-motor vehicles, such as mobile platforms for Military usage applications in which "Windshield" definition might vary from the classic use of windshield in automobiles, as will be appreciated from the context.

The present patent application describes method and applicable apparatus which facilitates displaying "Location Aware Entities"—LAE, over vehicle (or other mobile platform) windshield while driving (in the context of the invention "Driver" could be replaced with platform operator such as combat vehicle crewmember). What distinguishes described method from prior known art is the innovative concept which proposes that looking through vehicle windshield is analogous for playing a video stream. Following this fashion, the vehicle's windshield may act as on-board video camera and could be referred as a matrix or video frame with configurable height/width dimensions. Moreover, the described method herein identifies individual Geospatial (three dimensional coordinate describing LAE space) locations embodied in pre-defined section of three-dimensional space-encloses part of the visible surroundings (or scene) ahead of the vehicle and, LAE it on designated part of the windshield. After a Geospatial location is identified and projected to precise spot on the windshield, the described method facilitate windshield superimposing of associate indication—graphic icon, and data (such as but not restricted to—text, animation) in combination with HUD device.

An example for possible use of the method might be assisting the driver when asking the navigation system to put on view gas-stations located nearby. The navigation system assigns list of gas-stations which are received by described method and processed to identify which is located within predefined perimeter (radius). If any are found, the described method LAE them out and posts appropriate notation on the windshield revealing their estimated Geospatial location. Consequently, what depicted method and apparatus of present invention factually do is extracting geospatial information—Location Aware and En-Route guidance entities from two/three dimensional map (or other geospatial data source as explained later on), superimposes it on a pre allocated region on the windshield and display it using HUD device which have far better advantages than viewing the information on a video screen located remotely from the driver. The steps depicted above (Identification, Projection and Superimposing) are performed in combination with any type of Navigation System or Geographical Information System (GIS) deployed in vehicle. More particularly the navigation system might be a Built-In system as known in some car models such as—BMW Series 5/6/7, Toyota Lexus and certain GM Cadillac/Pontiac models. Alternatively, it could be applicable also to mobile multimedia devices such as PND (Portable/Personal navigation device), Cellular phone, PDA and APPLE Iphone, all equipped with internal navigation or location based services (LBS) capabilities. The method retrieves user/system selected geospatial locations which are stored in the navigation system storage and later on inquires certain Geo information layers such as Digital Terrain Model (DTM), Digital Surface Model (DSM) of area of interest (AOI) as well. Additionally, as mentioned before the method described herein could perform also with GIS stand alone components such as Google Earth and Microsoft Virtual Earth three dimensional on similar manner. An important aspect of described method and implementing apparatus is getting the current vehicle location from the navigation system. Most of Built-In navigation system have internal positioning device within, such as global positioning system (GPS) or triangular locator (Cellular devices). Following it, the implementing apparatus and method is capable of performing in either way. As for GIS components the apparatus might get the location directly from external GPS device installed out of the vehicle or indirectly over the GIS.

Location-Aware Entities (LAE), in the context of the present invention, refer to Geospatial Location as—geometrical shapes describing two/three dimensional object resides on terrain. Common shapes in known art include but not restricted to—LAE, Line and Polygonal. Moreover, any geospatial location consists of one or more three dimensional coordinates (X, Y, Z) describing the associated terrain object structure in space. For example to determine "WayLAE" we need to make use of a "LAE" as the equivalent geometrical shape (single coordinate). Another example is a Building object whose equivalent shape would by a polygonal modeling of the formation (three dimensional modeling for buildings employs digital surface model files created by known methods in related art). Following the above, Location-Aware Entities are defined as Geospatial locations employed for GIS information Layers applications (Google Earth for example) and employed for position driven services such as but not restricted to—Navigation systems, Mobile devices, three dimensional Visualization, Vehicular active & passive safety systems, Traffic updates, On-line Web location based content and Military Command & Control systems. According to that, the present method and apparatus facilitate displaying LAE elements which are inside the driving area in real time. Several examples for possible LAE of interest (LAE) which are user/driver display-adjustable include: Gas stations, Banks, Police stations, entertainment events, Trade/Shopping centers which are all located within pre-defined radius of current vehicle location. These entities usually emerge out of the landscape viewed from the vehicle windshield typically when driving at urban or interurban environment.

Generally speaking, any available Location Based Service (LBS) or GIS can create that kind of entities for commercial use. In addition, the described method and apparatus may serve LBS and GIS systems for displaying LAE locations and related information at real time on vehicle windshield while driving without interfering or risking the driver and his passengers. Other types of LAE are entities for guidance means such as Dynamic Directional Arrows (DDA) appearing right above the turn off (very effective in crowded area) or wayLAE for navigating in unpaved/rural terrain. An extra advantageous use of described method and apparatus is for military C2 systems (Command & Control) using it for Location/Situational Awareness needs such as HUD display for Light Armor Vehicles/4×4 vehicles/Logistics vehicles, out in battlefield or training Using HUD LAE Display could prove as very useful when moving over large area particularly at night time when orientation and visibility is poor.

According to some embodiments of the invention, the system may be arranged to receive LAE, e.g., LAE of interest (LAE) and wayLAE along the designate route ahead of the vehicle position.

Data processing system 100 further comprises a 3D modeler 130 arranged to generate a three dimensional (3D) model of vehicle surroundings (or scene) using the geographical information, and to enhance the 3D model with symbol representations of the LAE and the wayLAE.

Data processing system 100 further comprises a projection module 140 arranged to calculate, from the 3D model and in relation to a specified area of a windshield of the vehicle, a two dimensional (2D) projection comprising the symbol representations of the LAEs.

The symbol representations of the LAEs may comprise corresponding icons.

The symbol representations of the wayLAEnts comprise dynamic directional arrows. Dynamic Directional Arrow (DDA) may be used for en-route guidance. In most of present navigation system using HUD, when the driver inserts destination or user defined route, the navigation system displays constant directional arrow in the middle of the visible part of the windshield which is being rotated by the navigation device. The arrow then LAE in the direction determined by the navigation device. This manner of display may interfere or annoy the driver. The present invention has obvious advantage over prior art by combining with mapping data stored within the navigation system. The dynamic directional arrow (DDA) is placed only when a turn off or next wayLAE is visible ahead from current position. The arrow could also be flickered for getting the drivers attention just before the turn off if needed. Another advantage is placing the arrow in such manner which considers the range and terrain three dimensional structure of the turn off surface area. An example of such three dimensional terrain analysis would be placing the arrow just above the turn off as if it was a traffic light or traffic sign in a way which doesn't distract the driver or obscure the traffic ahead of the vehicle. Furthermore, the arrow display is intuitive to the driver since the arrow's shape rendering, acts according to perspective roles—closer looks bigger and the opposite also reckoning elevation and azimuth difference between the current vehicle current location and the turn off. Almost as if the arrow was embedded in the surroundings as part of the landscape ahead. Another relevant feature of described method is rendering the shape of the arrow according to the slope and rotation angle of the turn, providing the driver enough time to plan the turn successfully. In addition any related information such as street name which the turn heads to could be attached to the proposed directional arrow. Data processing system 100 further comprises a projector 150 arranged to project the 2D projection upon the specified area of the windshield.

The dynamic arrow overcomes limitation of current HUD systems. Most of common applications are used for vehicle indicators display as well as en-route guidance for vehicle driver. Systems for en-route guidance include Virtual Line and windshield display for navigation system. These systems are used for displaying directional objects such as three dimensional volumetric (Virtual Direction Line) and two dimensional (constant directional arrows). As mentioned before part of the directional arrows are superimposed constantly over predefined location of the windshield usually at the lower section of the windshield. The arrow is rotated according to instructions from the navigation system. That implementation could obscure other vehicles and even pedestrians in the road section ahead of the vehicle. Other directional arrow enables displaying an arrow which moves along with the driver eyesight by using viewing direction recognition device such as video camera the arrow could get shorter or longer according to the turn off angle and the relative position of the driver. That application might also raise similar problems as depicted before due to the hazardous position of the arrow on the windshield which may block visibility when superimposed on the road segment ahead. Other application which was introduced is volumetric display of virtual line which enables the driver sense intuitively the desired driving direction. The virtual line is superimposed over the upper part of the windshield in a way which doesn't obscure the road section ahead. That application raises other issues such as constant display of the virtual line even when not necessarily needed and may annoy the driver or other passengers in the vehicle when driving on a straight road and other physical setbacks derived from the special display of the virtual line such as illumination intensity glow conditions etc.

3D modeler 130 is further arranged to update the 3D model and the symbol representations of the LAEs (e.g., LAE and the wayLAE) at periods shorter than a first specified threshold, and in respect to movements of the vehicle, to the geographical information; and to specified rules.

Projection module 140 is arranged to update the 2D projection at periods shorter than a second specified threshold, and in respect to movements of the vehicle. Projection module 140 may be further arranged to calculate a field of view matrix form data relating to the specified area of the windshield; to calculate the 2D projection in respect to the field of view matrix; and to adjust the symbol representations in respect to the field of view matrix.

The Field of View (Fov) Matrix refers to a designated region on the windshield used for display means, such as the visible part of the windshield on driver side. Like other known matrix formation in the art the Fov matrix structure obtains configurable dimensions such as height and width. The matrix structure along with some other parameters such as range, derives the structure, volume and edges of the "Visible Section"—Three-dimensional space enclosed ahead of the vehicle. The formation of the visible section and volume may comprise significant effect on the method performance-time and accuracy. Another key issue concerning GPS reliability is degraded GPS signal environments—in particular, the urban canyon environment found in most large cities. A common approach in the automotive industry to minimizing the effects of degraded sky visibility and harsh urban multipath involves coupling the GPS receiver with an inertial sensor such as gyroscope. Considering the above, linking the vehicle telemetry, or having an interface to a mobile device internal gyroscope, accelerometer or compass (e.g., like in an iPhone) with the implementing apparatus would benefit in enhanced accuracy of Identification and Projection steps and performance.

A Fov matrix cell stores dedicated information about the visible section such as Vector (set of values) of Geospatial coordinates which illustrate GIS locations and turn offs for en-route guidance. The Datum and Coordinate System format which portray either the location or turn-off could comply with any standard known in the art. Another useful add-on of the method is the routine which LAE elements are identified and traced inside the visible section when in movement. In order to do so the method could use any positioning method known in art such as GPS, Triangular and Topological to locate the vehicle position and orientation. The Fov matrix should be calibrated before first use, the calibration might be performed before or after market, the set of parameters which should be configured comprise among others but not restricted to—dimensions of the windshield and visible part structure, distance from driver seat and vehicle dimensions.

Fov Matrix Configuration: In the context of the present invention the described method and apparatus is employed in combination with an HUD device whose display reflects over the vehicle windshield. Different vehicles obtain a diverse windshield characteristic which is even more obvious when considering private vehicles-automobiles compared to light and heavy tracks. Furthermore, even Automobile models from the same manufacturer obtain distinct windshield characteristics. Despite the varying windshield attributes, the described method and apparatus constructs novel set of parameters which when configured and calibrated facilitate—identification, projection and superimposing LAE and DDA over the windshield in a designated region of display (Fov matrix). Performing Fov matrix configuration means that this novel set of parameters is calibrated specifically per vehicle, HUD device and vehicle driver location before first use of described method and apparatus. The main principle when forming that set of parameters is considering the Fov matrix—Region of display, as a video frame, meaning that the Fov matrix pre-allocated region obtains similar but not entirely identical attributes. Thus, some of the attributes as depicted herein may comply with video camera calibration as known in the art, while some others are not. Some of these attributes may include: Vehicle location and 6DOF (six degrees of freedom which also include the vehicle slope in each axis). Fov matrix Structure—dimensions (length/width/height) Fov angles (horizontal and vertical) Vehicle dimensions, Distance from the windshield (driver seat) Driver seat height Windshield dimensions (including angles) Range (different ranges for various mediums) Vehicle range of velocities (also torque).

The first and the second specified thresholds may be 200 microseconds or less.

At least one of GIS module 110; route analyzing module 120; 3D modeler 130; and projection module 140 are embedded within a user communication device 150 having a GPS module 160 and receive geographical data from GPS module 160.

Data processing system 100 may further comprise a forecasting module 170 arranged to estimate user head position. Projection module 140 may be further arranged to recalculate the 2D projection in respect to the estimate user head position.

The HUD display should be correlated as much as possible to driver line of sight in order to achieve optimal performance. Most of current solutions in industry require dedicated HW direction device which track the head moves and adapt the HUD respectively. The majority of present patents suggest a VCR and related image processing algorithms for following the head moves.

The new invention suggests different approach to the problem which mitigates the need in a dedicated HW direction device.

According to latest researches the common head moves of the driver can be limited to ±20° horizontally and ±20° vertically from the "resting LAE"—which is the position of the head when the driver resettles in the vehicle.

As so the process of correlation is assembled from two consecutive steps:

Get the resting LAE of the driver at start—This is done by projecting a 5 cm radius ring (configuration parameters) in the center of the FOV matrix which as depicted former is derived from the vehicle/windshield model.

The user is prompted using the navigation device (might be either a PND, Smartphone or similar) to look ahead of the road in direct line and adjust using hot keys on the navigation device in order to set the ring in his line of sight (the hot keys simulate ring steps in 2D—right/left, up/down)

When this is done, the dedicated algorithm processes the offset from the center of FOV matrix and calculates the 3D volume where the driver's head is adopted.

Adjust superimposition and literally HUD projection at real time while driving according to the adopted 3D volume.

As specified formally (5) the superposition algorithm calculate continuously the area where the LBE image should be projected inside of the FOV matrix.

The novel algorithm inputs exclude the range & orientation to the LAE and also the spatial fixed compensation and tolerances derived from the 3D volume of driver's head adoption Available commercial navigation systems employ heads-up displays (HUD) showing the driver enroute guidance information that is reflected off the windshield and, to the driver's view, is superimposed over the terrain or landscape, seen through the windshield by the driver within the driver's visible section. Major drawback of prior art mentioned herein is displaying the arrows in the center or at the bottom of the visible part of the windshield and, obstructing the driver at minimum or risking him or other nearby vehicles and pedestrians at the worst case. Moreover, the arrow is displayed constantly on the windshield whether there is genuine need or not. The described method removes depicted shortcoming by rendering the LAE entities and directional arrows above the road at any time. An example of that kind of rendering would be posting the annotation over the top section of the building when seen from current location of the vehicle. In case the building is concealed by other taller building or terrain a billboard will popup behind the taller building indicating the relative location of the requested building and the fact that it is hidden from current vehicle location. The described method can differ graphically between different types of LAE according to user/software definition. In order to minimize the workload of the driver the method facilitates prioritizing LAE entities display by various criteria such as: Importance, Urgency and Distance. The rendered LAE elements could be two dimensional (seen from any viewLAE within the range) or three dimensional (be seen only if there is a clear line of sight). An applicable modification of the described method would be connecting it to vehicle on-board sensors, doing so will enable switching off the display immediately when intense braking is performed. The described method should be coupled to a given HUD device in the vehicle. The described method might work aside with any commercial HUD on the shelf such as Microvision's Laser Scanner, CRT (cathode-ray tube), LCD (backlit liquid-crystal display). An example for possible jointly employ with laser scanner would be—sending the scanner's servo information about the rendered LAE element which include among the rest—Fov matrix coordinate (x,y), colors to be used and pixel resolution. Consequently, the servo activates the lenses and minors which in turn maneuver the image from the display to the combiner. At last, the LAE element from the display is superimposed on the region of display.

An additional method may be producing a frame by the apparatus (similar to video stream frame clipped to the region of display) of LAE & DDA and communicate it to a PICO (Mobile projector based on MEMS technology) projector to stream over the FOV Matrix.

Terrain and Surface Analysis. The present invention makes exclusive and extensive use of digital mapping for superimposing LAE and DDA over the HUD device. That extended skills are applicable at present time due to two main reasons: a) The impressive technological advance in digital mapping and especially digital covering of broad geographic areas and amount of information extracted from image sensors such as LIDAR, airborne sensors and satellites. b) The rapid changes in computer technology such as more processing power and memory while smaller and efficient energy utilization. The digital mapping which might be used for employing the described method and apparatus herein contains common GIS information Layers such as: Roads and transport in general, two and three dimensional mapping of streets, Terrain (DTM/DEM), Surface which includes buildings and other construction in general (DSM), Vegetation, LAE (LAE of interest usually for commercial use such as ATM's, Banks, Restaurants, Emergency Services). In the context of the present invention "Terrain Analysis" means using DTM data for extracting terrain modeling and especially elevation and slopes data for certain area. That would be essential when trying to estimate visibility LOS (line of sight), LAE concealments by terrain (hills, valleys) etc. Another significant definition which must be acknowledged in the context of present invention is "Surface Analysis" meaning using digital mapping and especially DSM (Digital Surface Modeling) for extracting streets/buildings/roads data (such records could include type of road, street names, road Length etc) for visibility modeling (LOS), superimposition and display-refresh rates derived from location/velocity/time or distance. Performing real-time surface analysis might be proved very useful when the vehicle is imbued in urban/inter urban area. Nevertheless, employing the described method facilitate performing terrain and surface analysis satisfactorily in variant vehicle velocities and mediums.

Apparatus Implementation and Modifications. Other aspect of the present invention is depicting apparatus implementing the method described for enroute guidance and LAE superimposition using HUD. Following former clauses a typical embodiment for apparatus implementation would be vehicle with Built-In navigation system and HUD installed. The apparatus would be linked to the navigation system as part of software techniques well known in art and, exchange data with HUD control/projection unit. The apparatus calibration could be performed when the vehicle is still on the production line or after market by the manufacturer certified representatives. The apparatus would enhance driver's Location Aware by displaying LAE (LAE of interest imbued by LAE) which are stored in the navigation system storage and perform en-route guidance display of desired route as well as dynamic directional arrow when inserting a destination. The apparatus could also enable the driver to select apparatus configuration between several predefined options three such as selecting between programs: City ride, Inter urban (highway) and at last unpaved terrain. In each option the apparatus could adjust the display parameters to optimize apparatus performance. In order to accelerate apparatus performance, the apparatus may be linked to the vehicle telemetry (inertial sensors) for getting better apparatus results. Another optional embodiment would be a mobile PND/PDA/Cellular smartphone which imbues the described apparatus in special means for mobile device such as Plug-In Device—well known software technique in related art.

A smartphone equipped with internal Gyro/compass might be linked to a pico projector with wireless communication and after the driver performs one time calibration process for optimizing the HUD display.

Other potential apparatus modifications including linking the apparatus to external GIS system such as Google Earth or municipal/national traffic web servers, over valid network infrastructure (mostly wireless such as WIFI or WiMax) and transport protocols such as IP (Internet Protocol) or FlexRay (Inter vehicle communication protocol employed in Europe). Assembling that linkage would enhance accessibility to content related information such as Traffic jams, City work and on line events which occur in local driver surroundings (or scene) that may fit foreign drivers such as incoming tourists. Another aspect of implementation apparatus would integration with on-board safety systems such collision avoidance, pedestrian detection etc. Based on the described apparatus capabilities the integrated system could display safest real time avoidance (escape) track when detected potential threat/collision/pedestrian. The escape track could contain array of Geospatial wayLAE describing the necessary maneuver to be projected upon the windshield. A further possible implementation could be using vector map layers containing geospatial information about traffic signs and traffic warnings and display it when vehicle is located nearby. Apart from implementing method and apparatus described herein for commercial use, to my opinion the described method and apparatus could be also very useful for military practice, mainly for enhancing location/situational awareness for Light/Combat/4×4 platforms (with or without motor). In the context of present invention as appreciated in the rest of the document "Windshield" for military mobile ground platforms is defined herein as—a substance with "see through" capability which facilitate crew-member/s in the platform to capture platform's surroundings either for driving, observation or other practice and enable heads up display reflection in any method known in art.

In another embodiment of the invention a method for generating dynamic route display comprises the following stages: superimposing the LAE from the 3D model onto a screen in a specified position and in a form of a graphic indicator facing a viewer and associated with the vehicle, associating a position of at least one selected location aware entity (LAE) contained within the scene, with a respective position in the 3D model; and superimposing the LAE from the 3D model onto a screen in a specified position and in a form of a graphic indicator facing a viewer and associated with the vehicle.

The method may further comprise calculating a field of view matrix from form data relating to the specified area of the windshield, wherein calculating the 2D projection is carried out in respect to the image distortion or FOV matrix. The method may further comprise adjusting the symbol representations in respect to the field of view matrix.

The method may further comprise calibrating the projection module, estimating user head position and recalculating the 2D projection in respect to the estimated user head position.

The method may be embodied in a computer program product comprising a computer readable storage medium having computer readable program embodied therewith, the computer readable program comprising: computer readable program configured to obtain a position and a designate route of a vehicle, and geographical information related thereto; computer readable program configured to receive location aware entities such as LAE of interest (LAE) and way LAE along the designate route ahead of the vehicle position; computer readable program configured to generatea three dimensional (3D) model of vehicle surroundings using the geographical information; computer readable program configured to enhance the 3D model with symbol representations of the LAE's and the way LAE; computer readable program configured to calculate, from the 3D model and in relation to a specified area of a windshield of the vehicle, a two dimensional (2D) projection comprising the symbol representations of the LAE's and the way LAE; computer readable program configured to project the 2D projection upon the specified area of the windshield; computer readable program configured to update the 3D model and the 2D projection at periods shorter than a specified threshold, and in respect to movements of the vehicle; and computer readable program configured to update the representation of the symbol representations of the LAE's and the way LAE, according to the updates of the 3D model and the 2D projection; to the geographical information; and to specified rules.

The computer readable program may further comprise computer readable program configured to calculate a field of view matrix from data relating to the specified area of the windshield, wherein the calculating the 2D projection is carried out in respect to the field of view matrix, and further comprising adjusting the symbol representations in respect to the field of view matrix.

The computer readable program may further comprise computer readable program configured to track user head movements and to recalculate the 2D projection in respect to the tracked user head movements.

Figure 2:
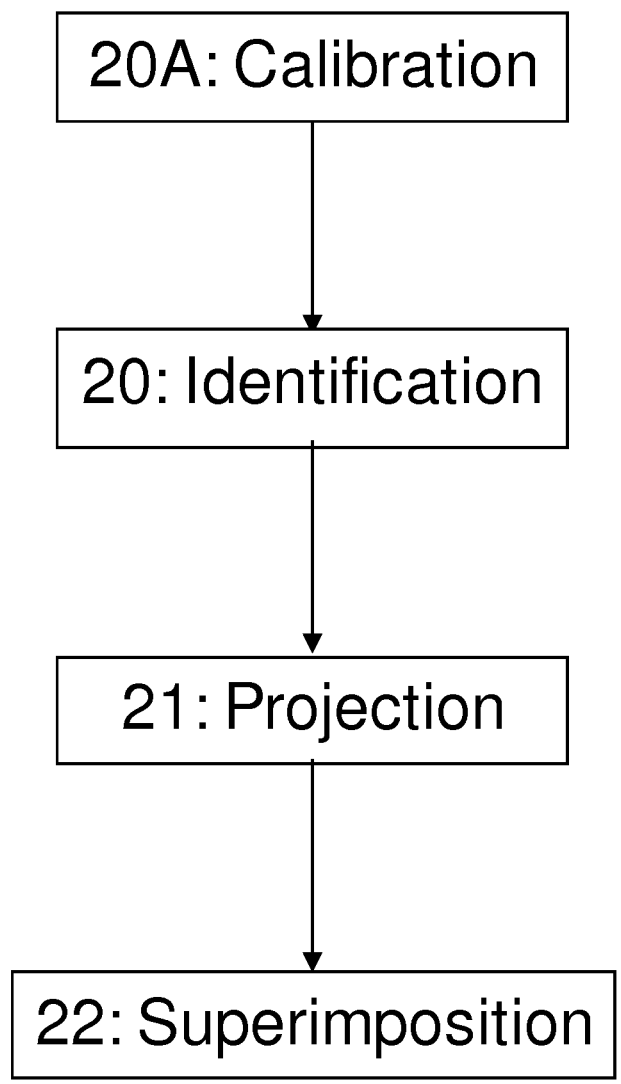
FIG. 2 shows flow charts of the method, according to some embodiments of the invention.

Referring now to the invention in more detail, FIG. 1 and FIG. 2 illustrate the common environment of the described method and apparatus. Region of Display 1 is pre-allocated virtual region of the described method on the windshield where LAE might be identified, projected and displayed. The formation of the region in FIG. 1 is trapezoid thus could be of any other polygonal type with defined Height/Width/Length. The Projection Unit 2 is usually in-dash component of the HUD device which is responsible for processing the requested image and traverses the lenses/mirrors for projecting it on the windshield. The windshield 3 is employed as the combiner part of HUD device, typically made of special substance which facilitates reflection and degrade glooming. Modern HUD systems reflect the image as focused to infinity in order to adjust it to human vision. The center LAE 4 of Region of display 1 is employed as the symmetric baseline of the vehicle, denoting that position of any object in the three dimensional space ahead of the vehicle is estimated relatively to the vehicle orientation. Consequently, according to the present invention the LAE elements display is aligned to vehicle orientation. Navigation device 16 could be of any known in art and might be placed as a built-in screen, out of dash or attached to the windshield, the navigation device 16 stores digital mapping data either inside or linked to exterior CD/DVD drive, the mapping material usually stores data about pre-defined area boundaries (such has California State). The described method facilitate displaying LAE elements whom are located in three dimensional space ahead of the vehicle and constrained by the region of display 1 boundaries as depicted later in FIG. 3. FIG. 2 presents the logic flow of the described method, which comprises a calibration step which is dynamic and is performed only if HUD device has changed position or change of driver position or different driver.

The HUD display is correlated as much as possible to driver line of sight in order to achieve optimal performance. Most of current solutions in industry require dedicated HW direction device which track the head moves and adapt the HUD respectively. The majority of present patents suggest a VCR and related image processing algorithms for following the head moves.

The current invention suggests a different approach to the problem which mitigates the need in a dedicated HW direction device.

According to latest researches the common head moves of the driver can be limited to +/−20 deg horizontally and +/−10 deg vertically from the "resting LAEnt"—which is the position of the head when the driver resettles in the vehicle. This allows projecting a 5 cm radius ring (configurable parameter) in the center of the FOV matrix which as depicted former is derived from the vehicle/windshield model.

The process consists of Calibration 20A (FIG. 2), which enables correlation between HUD display and Driver characteristic as follows. The process further comprises Identification 20, which determines whether given LAE elements are imbued in predefined three-dimensional space ahead of the vehicle. Projection 21 correlates LAE elements from former step to coordinate on Region of display 1. Finally, Superimposition 22 configures the necessary display information for optimum display and delivers it to Projection Unit 2.

The process of correlation is assembled from two consecutive steps: The HUD display receives an initial resting LAE of the driver and correlates it to driver line of sight in order to achieve optimal performance. Most of the current solutions require a dedicated HW direction device which tracks the head movements and adapts the HUD respectively (e.g., a VCR and related image processing algorithms). The current invention suggests a different approach to the problem which mitigates the need in a dedicated HW direction device.

The user is prompted to use the navigation device (might be either a PND, Smartphone or similar) to look ahead of the road in direct line and adjust using hot keys on the device in order to set the ring in his line of sight (the hot keys simulate ring steps in 2D—right/left, up/down). When this is done, the dedicated algorithm processes the offset from the center of FOV matrix and calculates the 3D volume where the driver's head is adopted.

Figure 3:
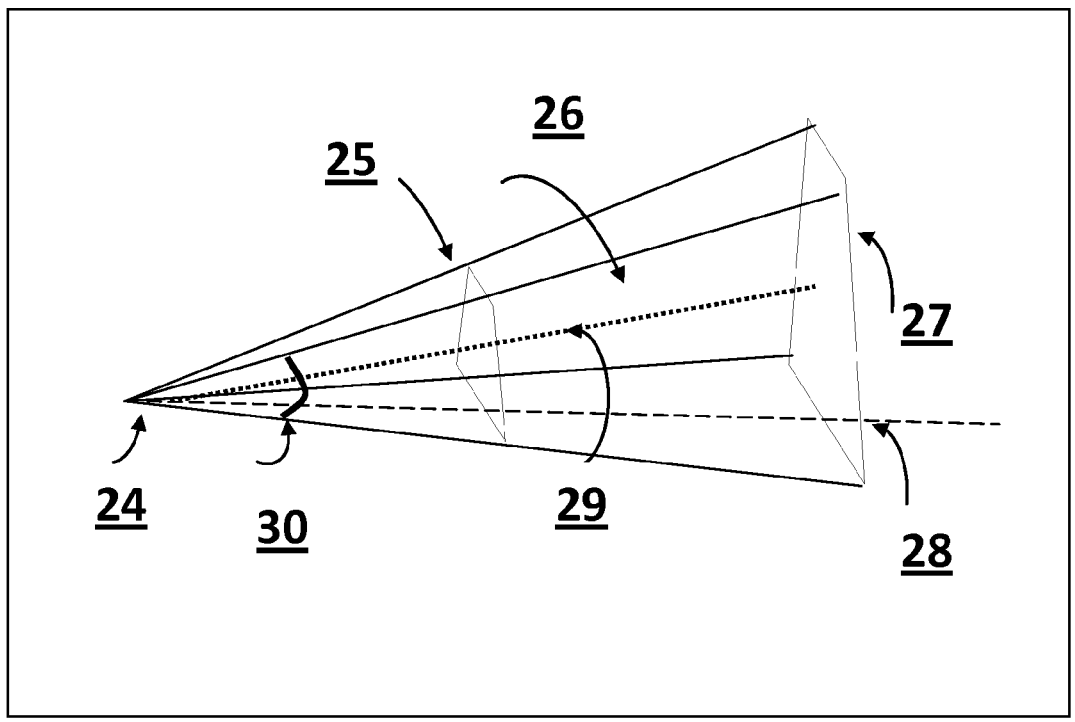
FIG. 3 presents schematic example visual view of the Fov matrix and 'visible section', according to some embodiments of the invention.

The method is initialized by identification step 20 of given LAE elements inside a three dimensional space ahead of the vehicle. The LAE element type to be identified could be driver or exterior system adjustable (exterior system could be any applicable navigation system). The LAE type display selection could be performed at any time of driving and not necessarily adjacent for entering destination or route. For instance, driving on the highway and closely approaching municipal area. An alert of fuel shortage is displayed using HUD device. The driver instructs navigation device 16 to display nearby gas stations. Navigation device 16 transfers list of gas stations with related data (geospatial position and other optional informative details such as name and logo). The formation of the LAE list is application dependent. Eventually for calculating which LAE elements of type "Gas Station" is located nearby, the described method identifies which of the gas stations in the received list is imbued inside the Visible Section as illustrated in FIG. 3.

Fov Matrix Definition. FIG. 3 presents a visual scheme of the three dimensional space ahead of the vehicle. Driver view LAE 24 is shown at the left side. Field of View (FOV) horizontal and vertical angles 30 are subject to straightforward known art parameters which reside from knowledge about human vision. FOV Matrix 25 is virtual region on the vehicle windshield which resizes the Visible Section 26. The Virtual Screen 27 is the distant corner of the visible section. Imaginary Terrain 28 illustrates the surface features ahead of the vehicle. Center Line 29 originates from driver view LAE and exceeds the center of the Fov matrix 25 till clouting the virtual screen 27 and constrained by pre-configurable range limits.

LAE Visible Section Identification In order to determine whether given LAE element is imbued in the visible section, vehicle position and orientation should be resolved. The common ways in related art to resolve object's position is getting it from known navigational devices such as GPS (global positioning system), DGPS (Differential GPS) or Triangular Locator (used for cellular mostly). Focusing on GPS, the data retrieval includes real time three dimensional coordinates of the vehicle—Longitude, Latitude and Elevation (correspondingly X,Y,Z) and part of vehicle slopes. The vehicle orientation could be extracted from GPS data but due to known GPS deviations and performance degradation in dense urban area it would be recommended to integrate in-vehicle sensors such as inertial sensors (Gyro or ABS sensors for example, or mobile device such as Smartphone internal gyro/compass) these sensors can calculate vehicle residual deviation and angles which are especially critical when vehicle rotates. The vehicle position resembles the driver viewLAEnt which allows with straightforward calculation to determine the geospatial location of the Fov matrix 25 vertexes and correspondingly the virtual screen 27 vertexes location which jointly with the Centerline 27 (range) comprise the visible section 26 borders. Finally, a three dimensional mathematical calculation known in related art is performed to determine whether given LAE element location is imbued inside the confined visible section space.

Fov Matrix Configuration. The Fov matrix 25 could be formed from any known polygonal shape with defined Length/Width/Height dimensions. The Fov matrix 25 is an abstract arrangement of geospatial dataset which has no physical evidence on the windshield. It is employed only for abstract logical flow of described method and implementing apparatus. The primary consideration when deciding about the optimal Fov matrix shape should be gaining maximum part of the visible region of the windshield (visible to the driver). According to that, the optimum shape of the visible part is derived from unique set of parameters such as but not restricted to: vehicle dimensions, distance between the driver seat and windshield, front mirror location, windshield variants such as glass convexity and dimensions. If PICO projector is used, additional constraints are added, such as Projector location—either on the dashboard or attached to the sunscreen just above the driver; pico distance and angels from the windshield; and pico image display specified capabilities such as projection area $2d$ size.

Once forming the Fov matrix region shape the matrix is initialized by dividing the region to pixels—matrix cell storing data (similar to common term in video processing related art), the product of height and width (pixel unit) is defined as the "Matrix Resolution". Each pixel in the matrix receives associated two dimensional coordinate (X, Y) resulting creating windshield's set of coordinates (visible part only).

Visible Section Boundaries. Still referring to FIG. 3 the visible section is defined as the observable part of three-dimensional space ahead of the vehicle and literally imbues plurality of objects which reside from the road segment in front of the vehicle until the imaginary borderline of the horizon. If looking on the visible section from a bird's eye than the visible section's three-dimensional embodiment is confined by three major elements which are coupled together by virtual cords. a) At the bottom—the surface which the vehicle moves over, b) From the front side—Fov matrix edges and, c) On the rear side—Virtual screen edges. The compliance between the visible section and the Fov matrix facilitates correlating a single LAEnt in the visible section to a matching pixel of the Fov matrix, therefore a bigger visible section size outcomes in more data processing and memory usage. Consequently, defining optimal visible section size is critical and might enhance method and apparatus performance. Moreover, what deeply affects the visible section size is the range parameter, denoting that if current driving is performed in dense urban area the range which the visible section is derived from should not exceed more than few kilometers (or miles). This is not the case when driving over wide and open terrain, in this scenario the range size might comply with surface embodiment and human vision limits. That is why range parameter is system/user adjustable at any time of the trip and subject to application dependent. For instance, possible application feature might define several apparatus states for range adjusting—"Urban", "Inter-Urban", "Highway", "4×4" etc'.

Figure 4:
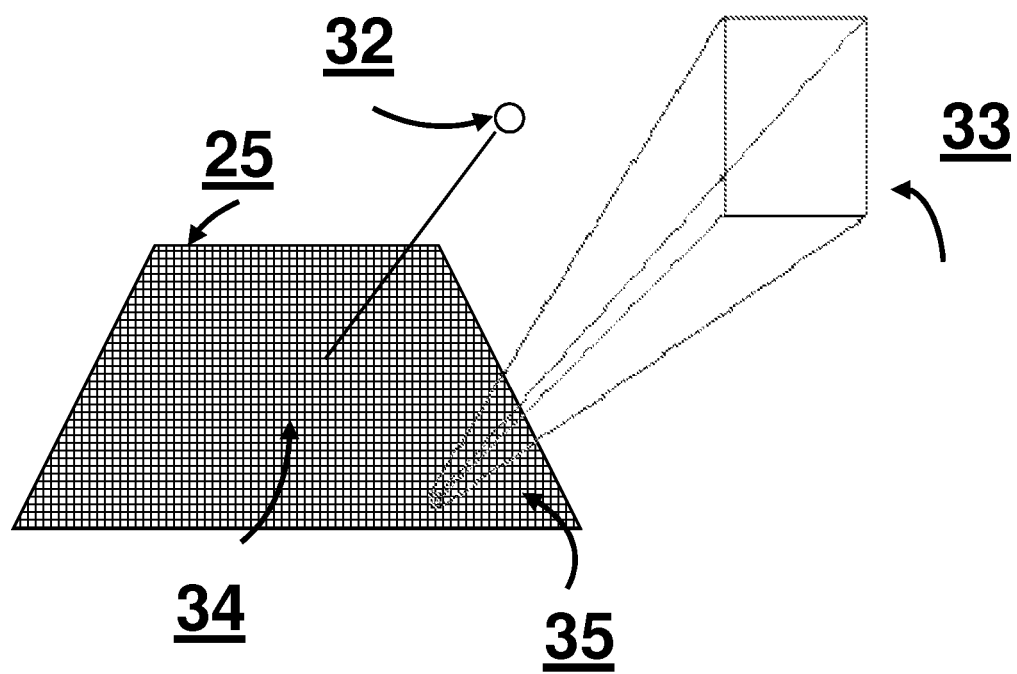
FIG. 4 presents schematic view of three dimensional Geospatial LAE projections over the Fov matrix/windshield, according to some embodiments of the invention.

LAE Element Projection on the FOV Matrix Referring now to FIG. 4 the next step once the LAE element was identified inside the visible section is projecting it over the Fov matrix. FIG. 4 demonstrates the projection operation as if we are standing in front of the vehicle and behind items 32-33 whom are projected over the Fov matrix 25. 32 illustrate a single spot (two dimensional) projection while 33 illustrate projection of a building front side (three dimensional). 34-35 are the corresponding projections on the two-dimensional Fov matrix, the projection could be considered as sending single cord (LAEnt 32) from two dimensional object such as a way LAE, or alternatively several cords (building face 33) from a three dimensional object imbued in visible section 26 (FIG. 3) to the Fov matrix 25. The hitting LAE of each cord on Fov matrix 25 is converted to matching pixel in the matrix. Projection from a single two/three-dimensional coordinate to matrix's pixel is a mathematical calculation which is ordinary skill in related art. Once the LAE element was projected and the correlating Fov matrix pixel/s was obtained, the related data of given element is stored in the associated matrix pixel/s. The stored data contains information such as but not restricted to: Geospatial location of the LAE element model (whether two/three-dimensional), Relative azimuth to the Fov matrix center line (29 in FIG. 2) and Element range from vehicle.

Figure 5A:
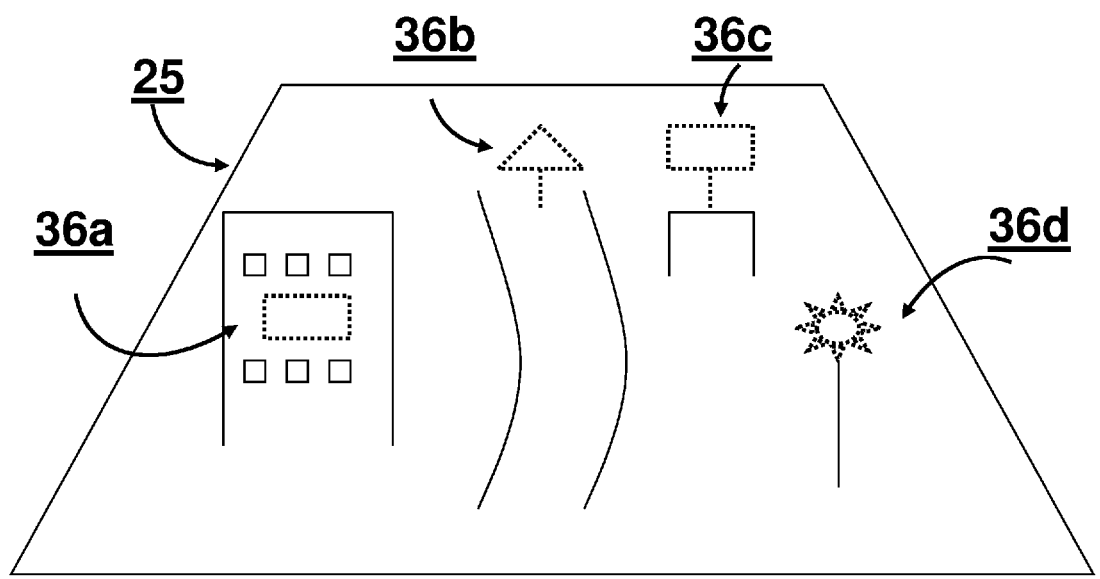
FIG. 5A presents a schematic example of superimposed LAE elements over optional HUD, according to some embodiments of the invention.

Superimposed LAE Elements over the Windshield. The last step in the described method is superimposing LAE elements on the display region of the windshield (FIG. 1, item 1). The method also comprises adjusting the superimposition and literally HUD projection at real time while driving according to the adopted 3D volume. As specified formally (5) the superposition algorithm calculate continuously the area where the LBE image should be projected inside of the FOV matrix. The novel algorithm inputs exclude the range & orientation to the LAE and also the spatial fixed compensation and tolerances derived from the 3D volume of driver's head adoption Employing this described method of present invention obtains considerable advantages over prior art, mainly because of terrain and surface advanced analysis skills. LAE elements are superimposed while some essential considerations are undertaken:

Position Awareness. The superimposed display of LAE element provides the driver very clear and intuitive indication about estimated position and relative direction, this could be employed by displaying related graphics (icons) and data on billboards posted over building face or flags emerging from the ground. Referring now to FIG. 5A there is shown a view LAE from driver position looking outside through the virtual display region which is the Fov matrix 25. Items 36a-36d demonstrates possible display types for different LAE elements. As it could be understood from the diagram items 36b, 36d illustrate flags emerging from the ground indicating the estimated relative position and distance of LAE element. Moreover, item 36a illustrates annotation posted over much closer building face while 36c illustrates billboard coming out of the roof of distant one.

Figure 5B:
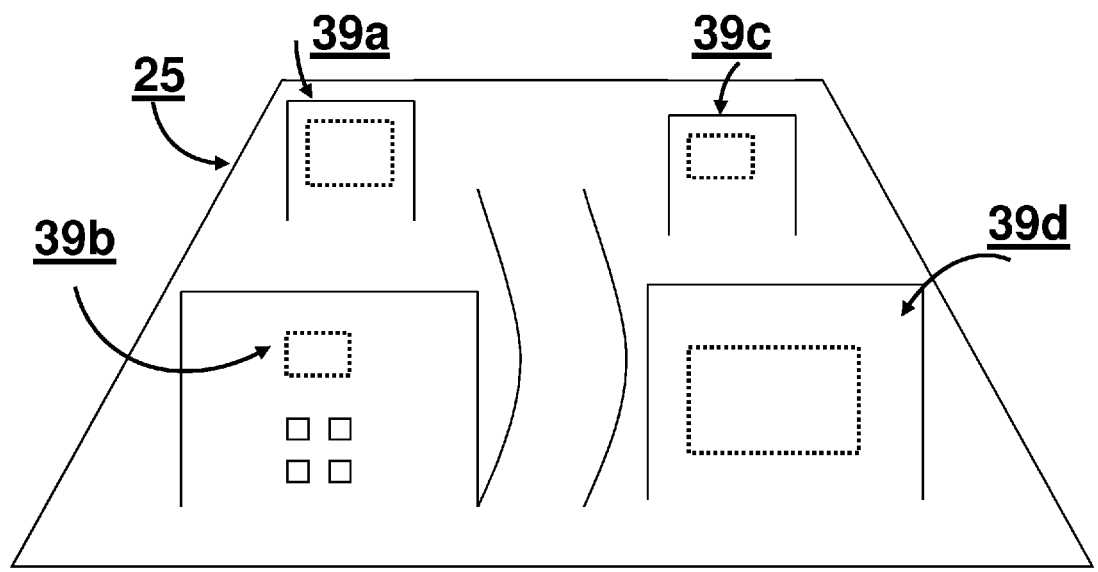
FIG. 5B illustrates a view of sizing policies for LAE element display, according to some embodiments of the invention.

Perspective and Resizing. The superimposed display considers known perspective rules such as "what looks bigger is closer", this issue could be approached in numerous ways as referred in FIG. 5B, for example: 1) Obey the rule literally—meaning that distant LAE elements will get smaller graphic icons (less pixels on the windshield), item 39c illustrates the smaller display for the distant building while item 39d illustrates the larger display for the same building but when getting closer. 2) Employ the opposite—Smaller objects which appear to be distant obtain bigger graphic indication but when approaching closer, the same indication gets smaller and resized according to range and orientation. Item 39a illustrates the larger display for the distant building while item 39b illustrates the smaller display for the same building except when getting closer. 3) Employ dipper surface and LAE element analysis—using combination of polices mentioned above by dipper analyzing of a given scene resulting in much more sophisticated sizing policy.

Figure 5C:
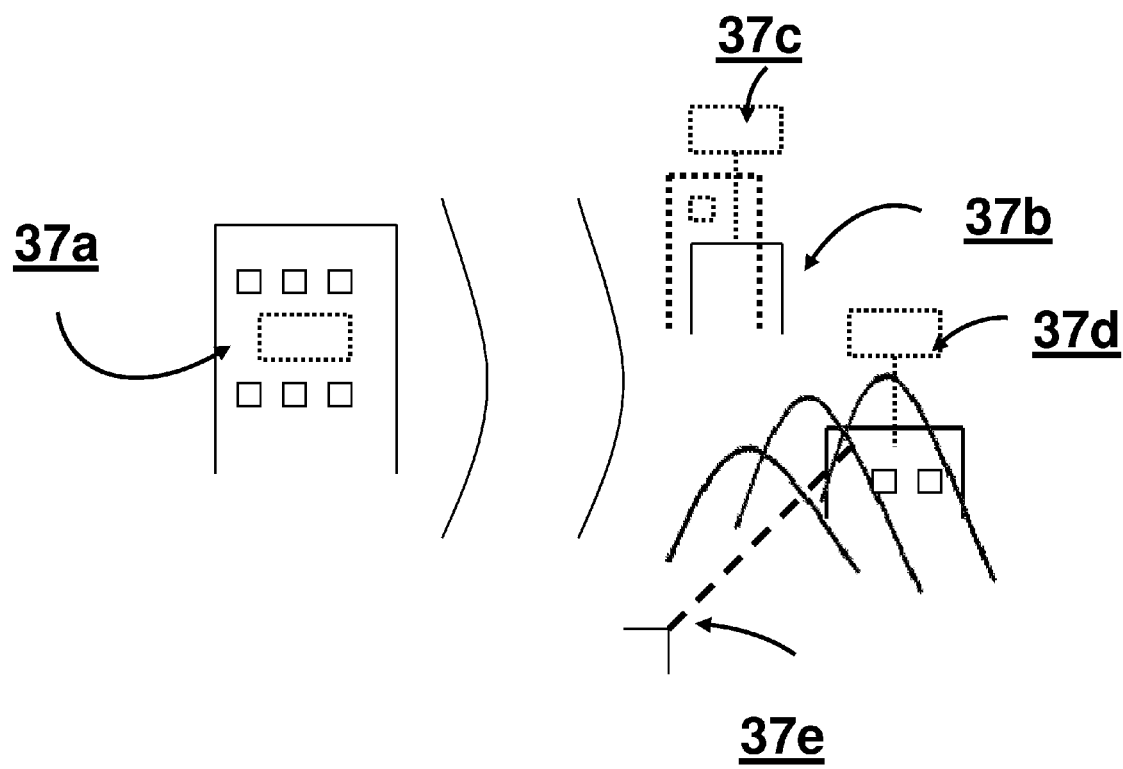
FIG. 5C presents a schematic example of LAE elements display when concealed by structure or terrain, according to some embodiments of the invention.

Landscape Features and Safety. Another noteworthy skill of the described method is capturing landscape features imbued in visible section from associated digital mapping which could include among the rest—DTM (digital terrain modeling, DSM (digital surface modeling) and additional Vector data layers. using digital mapping facilitates superimposition of LAE elements with minimum driver distraction or interfering road/traffic visibility. According to that, still referring FIG. 5A item 36b is emerging from the part of the road ahead of the vehicle in a way which doesn't block or obscure visibility of vehicles or traffic signs ahead, the LAE element flag height could be pre-configured by implementation. For instance LAE elements in urban area will comply with standard traffic light/signs height. Alternatively, it could be determined in real-time by calculating elevation delta (difference) between the LAE element's geospatial location and the vehicle position. In addition, the described method detects whether terrain or surface features (three dimensional objects such as buildings) occlude the line of sight to given LAE element and novell measures are performed for indicating the estimated position although not visible at that time from current vehicle position. FIG. 5C demonstrates two possible types of occlusions; item 37a illustrates unblocked view of building and the associated LAE display. Item 37b illustrates a building which is occluded by a dashed building in front of the current view LAE position—in this case the billboard 37c will emerge from the top of the dashed building indicating that the estimated position of the LAE element is concealed. The secondary scenario is presented from different view LAE, Item 37d illustrates the same billboard display but in this case the occluding objects is group of hills residing from the terrain ahead, the billboard would emerge from the top of the taller hill in the group.

Related Information. Beside the graphic indication of the LAE element the described method and apparatus facilitate displaying related data which might add important extra information such as description of next wayLAEnt surroundings or information about traffic jams and road accidents ahead. An optional applicable feature would be switching between display/hide information (text) by driver selection. Moreover, display icons, colors and text fonts could be adjustable or pre-configured from the navigation device.

Figure 5D:
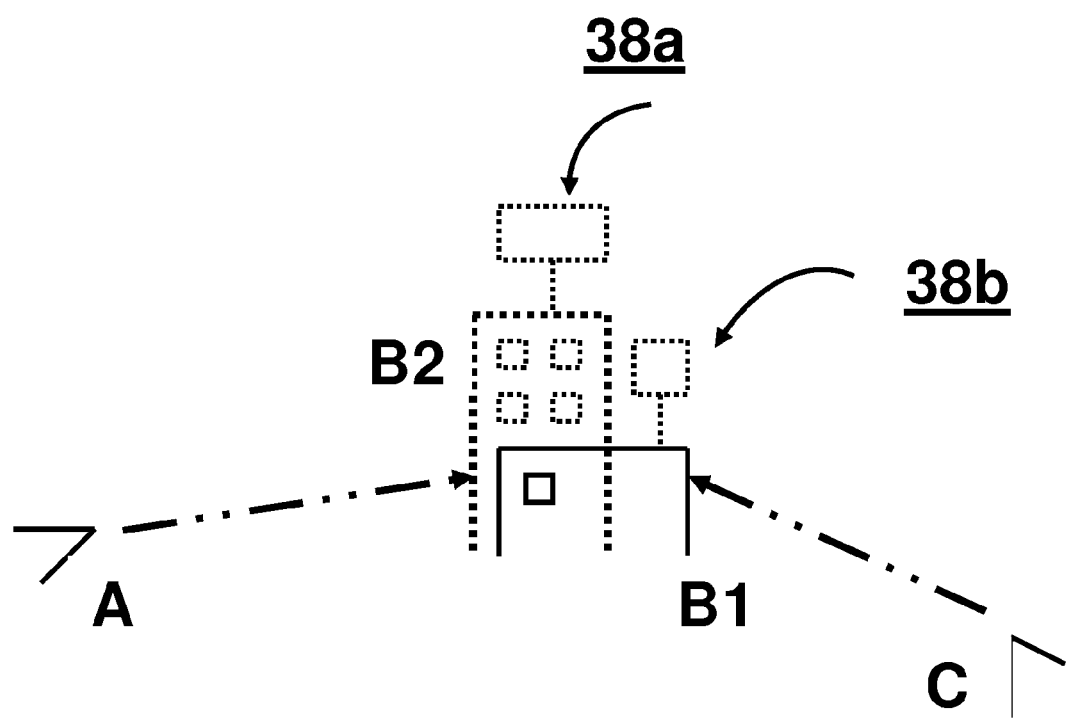
FIG. 5D presents a schematic example of special embodiments of LAE elements Display using two/three dimensional icons, according to some embodiments of the invention.

LAE Type Extension. The described method and apparatus facilitate adding any type of LAE as long as it obtains geospatial characteristic. In other words, different types of LAE might be employed whether commercial, navigational, traffic or military. Moreover the method and apparatus described herein doesn't limit the number of sources for extracting LAE elements at same time. Despite that, limiting the number of LAE elements displayed concurrently on the windshield is subject to driver/application adjustment. Additionally, the described method facilitates superimposing two/three-dimensional graphic icons for LAE display. The primary difference between the two types is that two dimensional icons could be viewed by the driver from any eyesight (as long as the element resides in predefined range) on the other hand, three-dimension icon would be superimposed only if the given position could be viewed in reality. That difference is illustrated clearly in FIG. 5D, when observing from position C on B1, item 38b could be either two or three dimensional icon, yet, when observing on the same building but from position A the dashed building is blocking B1, denoting that only if 38b is two dimensional icon it would be displayed from the top of the dashed building. The usage of either type is implementation dependent.

Figure 5E:
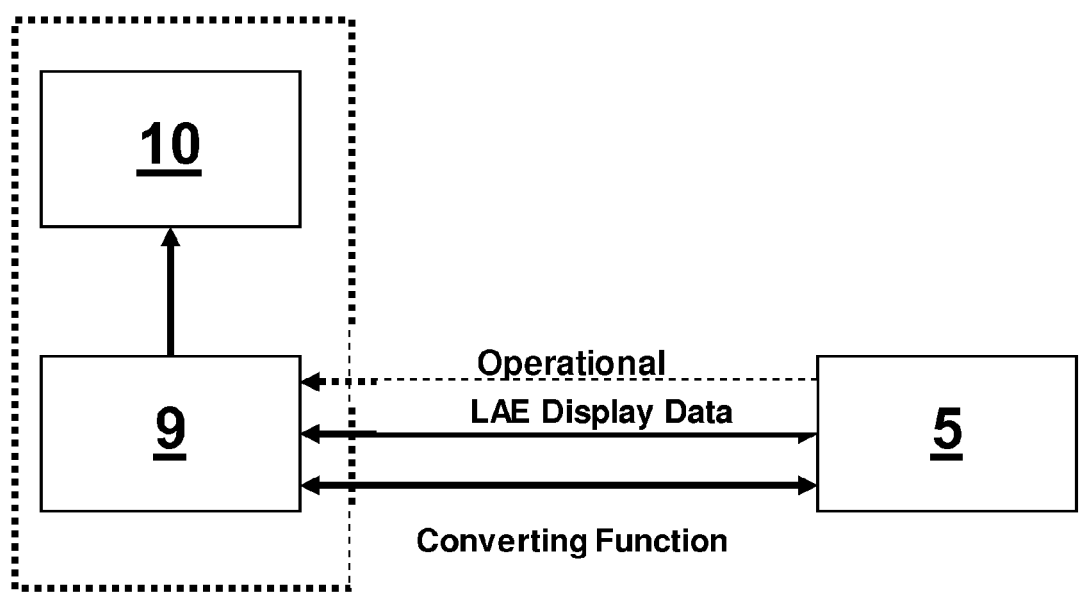
FIG. 5E presents a schematic example of data flow between implementing apparatus and HUD, according to some embodiments of the invention.

LAE Superimposition and HUD Display. When employing the described method and apparatus in combination with HUD device, several data types are transferred between. Initially, a conversion function between Fov matrix coordinate system and the Projection Unit system must be obtained. Possible implementation of such function would be a "Lookup Table" which is straightforward method known in related art. Secondly, mandatory display information such as: Number of coordinates (pixels), LAE type, Icon number, Color number, Font, Size, Label and so forth most be also delivered. Finally operational data such as turn-on/off system, show/hide text when a braking operation has been performed should be also transferred. Additionally, The described method and apparatus could be combined with any type of HUD device available on the market, due to abstract dataflow layer as illustrated on FIG. 5E. Item 5 illustrates the described apparatus, item 9 refers to the projection unit of the HUD device and item 10 is the combiner. The three streams of dataflow mentioned herein are presented by the dashed arrow which denotes that operational data might be controlled either from described apparatus 5 or by the navigation device, depends which is connected to vehicle sensors.

Figure 7:
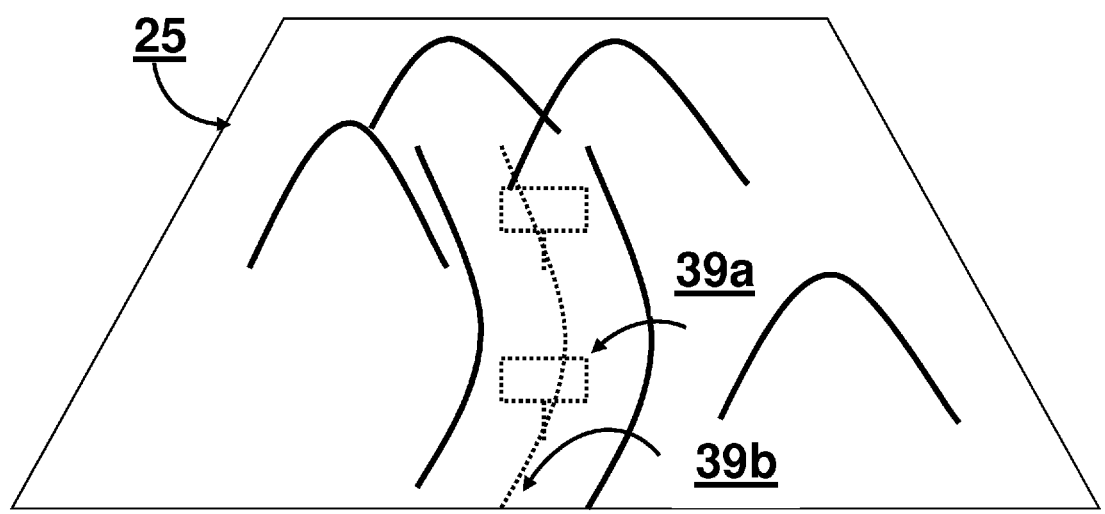
FIG. 7 presents a schematic example of Route display using HUD, according to some embodiments of the invention.

Superimposed En-route Guidance over the Windshield. Beside of superimposing single icon describing LAE element the described method facilitate superimposing Route display imbued in the display region. Driving Route is usually comprised of set of wayLAEnts (coordinates in earth-centric align or Cartesian system). Each of the wayLAEnts is a single LAE element, thus, superimposing driving route means displaying group of LAE elements. Displaying such a route would be more useful to my opinion when driving in rural/unpaved area compare to urban medium mostly for safety reasons. There are two common ways for defining a route 1) Enter/import wayLAEnts into a navigation device commonly used for 4×4 trips, 2) enter individual destination/address from a list most used when driving in urban/inter urban mediums. FIG. 7 illustrates such an optional route display: item 40a demonstrates displaying a billboard of wayLAEnt which belongs to a track ahead. Extra information about the wayLAEnt could also be displayed attached to the billboard. Item 40b represents a possible display of a line interpolated between two wayLAEnts. The interpolation could be extracted from digital mapping which assists in making it more realistic by tracking the surface elevation plurality. Alternatively, a simple mathematical calculation which is an ordinary skill of related art could be employed. The track segment and wayLAEnts to be displayed could be derived out oft predefined range aside to visibility conditions based on landscape features.

Superimposed Dynamic Directional Arrow (DDA) over the Windshield Superimposing of DDA is another aspect of present invention. The described method leverages terrain and surface analysis for superimposing safe and intuitive directional arrow over the HUD display as be explained in next paragraphs. The DDA display is based on three sources: a) known vehicle location and orientation (extracting GPS/Triangular locator data and Vehicle on-board sensors such as—Gyroscopes, odometer accelerators and ABS). b) Turn-off list received from current navigation device. c) Digital mapping of related area. The arrow display rotates according to turning direction and additional information (such as: street name or LAE description). Several aspects of DDA features are discussed below.

Figure 6A:
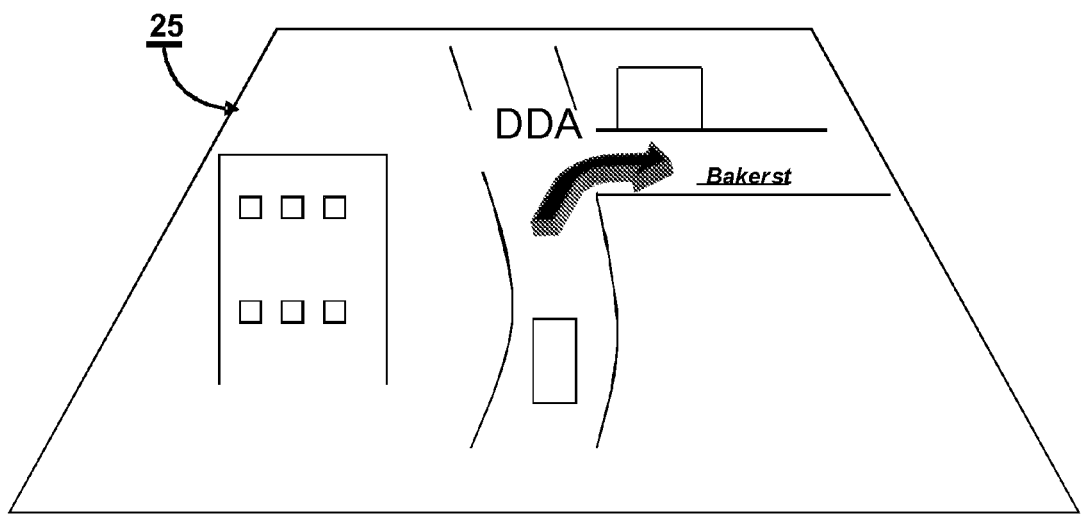
FIG. 6A presents a schematic example of DDA display using HUD, according to some embodiments of the invention.

DDA Position Awareness. The superimposed display of DDA provides the driver very clear and intuitive indications about the next turn off. When the driver selects destination/address the navigation devices processes the optimal route and delivers the described apparatus a sorted list of turn offs by topology (meaning the nearest turn to take is the first on the list and so forth). The described method and apparatus extracts the given list. Each time a turn off from the list is visible from current position of vehicle an arrow is superimposed over the estimated location of the turn by LAE the center of the DDA on the intersecting streets/roads. Referring now to FIG. 6A the arrow's head—marked as DDA on the diagram, is superimposed on the road/street where the arrow LAE to and the tail is LAE over the current street/road where the vehicle is turning next. The described method considers the turn off LAE as a LAE element and commits real-time surface and terrain analysis to determine the estimated turn off location. Sensing the turn off visibility is an important feature of the described method—The arrow is displayed only when needed and leave the driver enough time to plan taking the turn off. Doing so, is far better than prior art which usually displays a constant arrow on a screen/windshield without considering true visibility and exact location of the turn off.

Figure 6B:
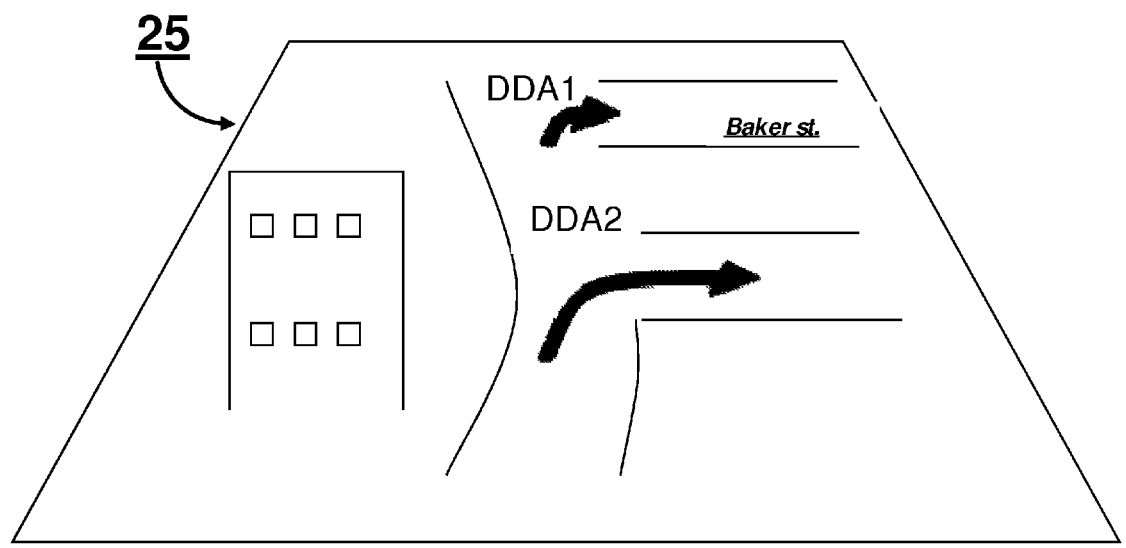
FIG. 6B presents a schematic example of DDA display, which employs perspective rule using HUD, according to some embodiments of the invention.
Figure 6C:
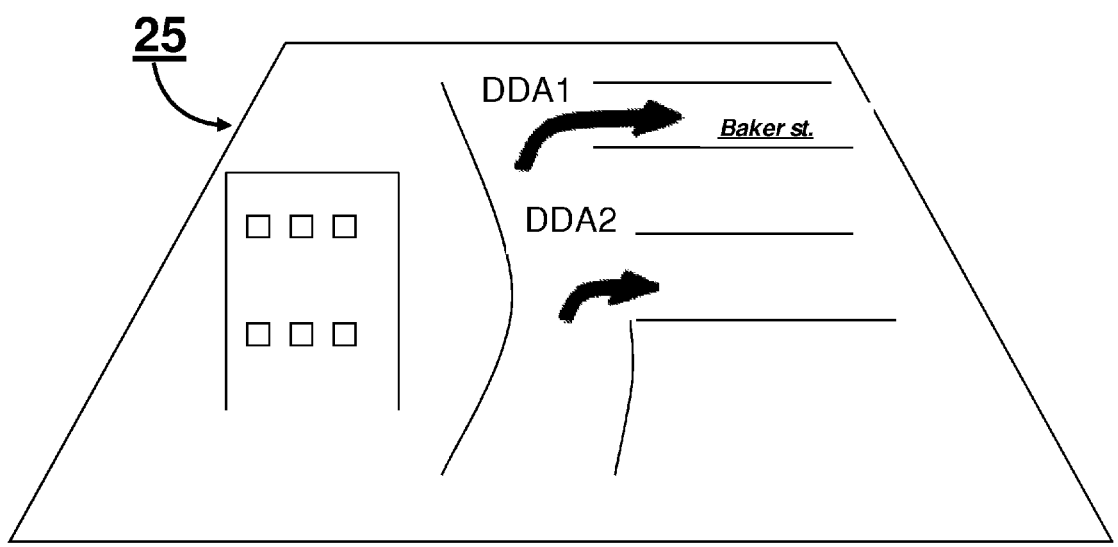
FIG. 6C presents a schematic example of DDA display which behaves opposite to perspective rule (policy No 2) using HUD, according to some embodiments of the invention.

Perspective and Resizing The superimposed DDA display considers known perspective rules such as "what looks bigger is closer", the issue could be approached in numerous ways as referred in FIG. 6B-6C, for example: 1) Obey the rule literally—meaning that visible distant DDA would get smaller graphic icons (fewer pixels on the windshield), Item DDA1 illustrates the smaller display for the distant turn off while item DDA2 illustrates the larger display for closer turn off. 2) Employ the opposite—Smaller objects which appear to be distant obtain bigger graphic DDA indication but when approaching closer the same indication get smaller and resized according to range and orientation. Item DDA1 illustrates the larger display for the distant turn off LAEnt DDA1 while item DDA2 illustrates the smaller display for the closer turn off LAEnt DDA2. 3) Employ dipper surface and DDA analysis—using combination of polices mentioned above by dipper analyzing of a given scene resulting in much more sophisticated sizing policy.

Landscape Features and DDA Safety Features Performing terrain and surface real time analyses as obtained by described method facilitate optimal superimposing of DDA. Capturing turn off surroundings and especially three-dimensional structures nearby such as buildings or two dimensional as roads and streets in the area, benefits in better planning the superimposed DDA in a way which would not obscure or annoy the driver. This eventually outcomes in improved safety and much less processing driver workload opposed to prior art. The DDA could be displayed at any height and position correspondingly to outer environment, minimizing occlusions with other objects in visible section of road ahead. Secondly, the DDA could be displayed according to time and distance of the vehicle position relative to turn off location. In more detail, if the vehicle is moving in dense urban medium the DDA could be displayed when the turn off is visible over a pre-defined range (adjustable according to medium type), when approaching closer it could be flickered relatively to remained amount of time (based on vehicle velocity and remaining distance). Alternatively, if the vehicle is not moving (such as in a traffic jam) the DDA could be flickered when a predefined distance is left before the turn off. Finally, the superimposition of DDA shape could be simulating the slope and rotation angle of the turn off (sharp angle such as 45 deg' or higher as captured by related digital mapping), that would clearly increase driver situational awareness and safety.

DDA Related Information. Except of Graphic display indication of DDA, the described method and apparatus facilitate displaying attached related data to the arrow which might add important extra information such as description of street name and remaining distance to the street which the arrow LAEnts to. An optional applicable feature would be switching between display/hide information (text) by driver selection. Moreover, display icons, colors and text fonts could be adjustable or preconfigured from the navigation device.

DDA Display Options. The manner of displaying the DDA has significant influence on the effective usage by a human driver. The primary goal should be employing displaying behavior which integrates safe, efficient and intuitive superimposition. Thus several options exists for fulfilling that goal, among them is display flickering DDA when the turn off is visible for acquiring driver intension. Using unique colors which distinguish the DDA from other objects imbued on the road ahead. employing two\ three-dimensional arrows for better sensing the turn off surface conditions such as displaying leaning DDA according to turn off slope etc'.

DDA Superimposition and HUD Display When employing the described method and apparatus in combination with HUD device certain issues should be taking care off. The windshield reflection intensity of DDA (in related art this means adjusting alpha values which define transparence intensity) flickering capabilities, pixel resolution, contrast values and finally display refresh rates.

Superimposed Anti-Collision. Routes over the Windshield Another applicable aspect of described method superimposition skills would be performing data fusion with known in art safety assist systems such as image processing chip on-board of Mobiliye or alternatively Collision Avoidance Systems (CAS) employing radar detection for enhancing driver's situational awareness. What most of those systems do is warn the driver about prospected collision with outer objects such as pedestrian, vehicles and other rigid substance. As soon as potential collision is detected the safety system calculates and provide optional (optimal hopefully) escape track. In prior art the escape track is sketched over a video/map screen and consist of image processing or radar scanning of the vehicle surroundings (usually only detecting road section ahead and rarely 360 degrees around).

Figure 8:
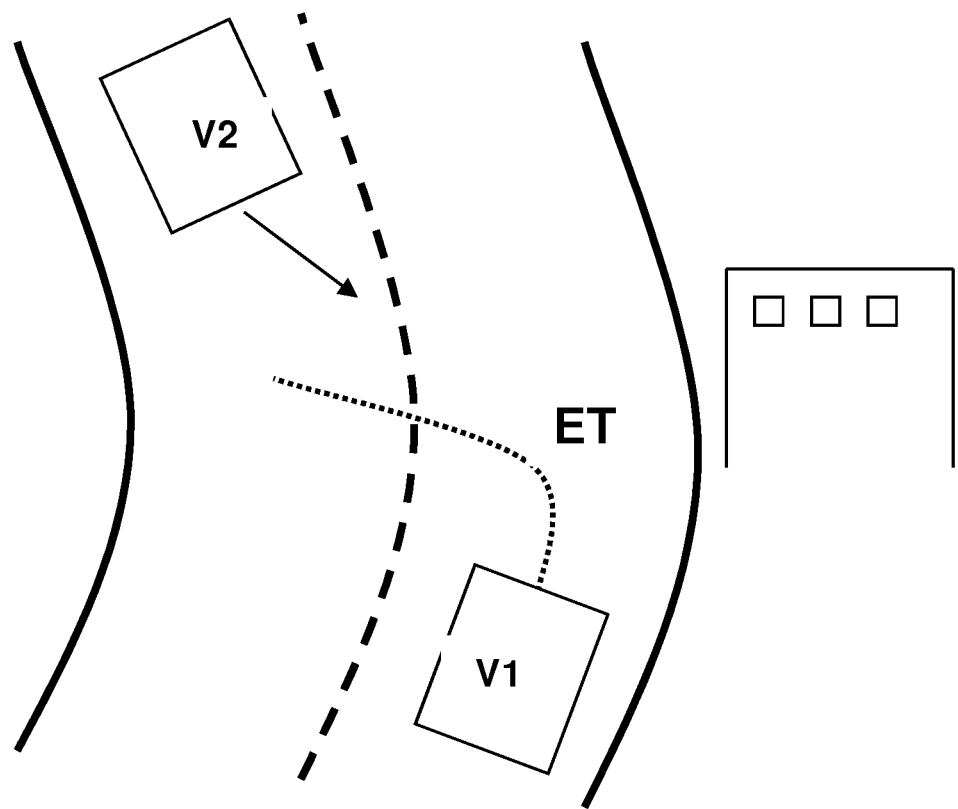
FIG. 8 presents a schematic example of integrating on-board safety system—an avoidance maneuver display using HUD when potential collision is detected, according to some embodiments of the invention.

Embodiments of the present invention may intervene in the first phase of the depicted process performed by the CAS. Obtaining real-time terrain and surface analysis based on vehicle current location and fusing it with cues and object recognition effort performed by CAS introduce three considerable advantages: 1) Improved Location Awareness by better capturing vehicle surroundings (360 degrees around). 2) Terrain and surface real-time analysis is faster oppose to heavy image\radar processing, thus fusing cues extracted from described method would comprehensively enhance CAS performance 3) Optimizing escape-track planning by considering terrain and surface features which results in suggesting improved avoidance options based upon vehicle all around modeling. Additionally, Escape-Track could be superimposed by the described method on the windshield in a optimal manner which resides over visible section surroundings and leaving the driver to keep following the displayed track. Referring now to FIG. 8, V1 represents the vehicle with HUD device obtaining the described method and apparatus. Second vehicle—V2 is moving from opposite direction and suddenly loses control when taking the serpentine. The enhanced CAS system with described method employed, immediately detects the second vehicle as potential threat and by fusing data from the described apparatus concludes that considering the vehicle's position it is a two way road (no need in image processing to extract this information simply digital mapping) and V1 is approaching a sharp serpentine. more information from the described apparatus LAE about the presence of nearby building from the right side and serpentine slope angle is transferred to the CAS for planning optimal escape-track marked as ET in the diagram. Consequently the determined track is displayed on the windshield visualizing very clearly the way out of danger.

Figure 9:
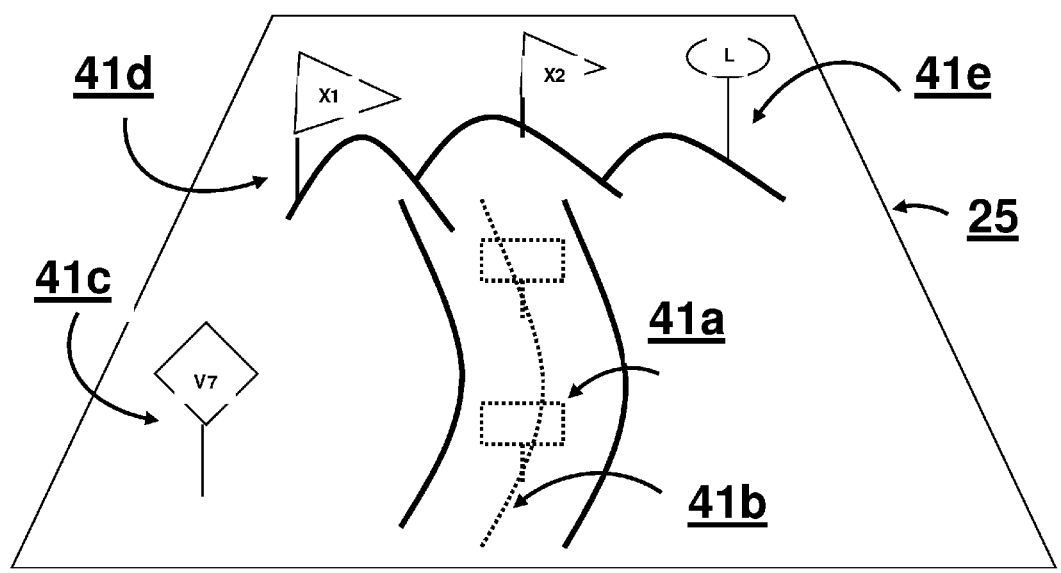
FIG. 9 is a view of enhanced situational awareness apparatus implementation for military practice using HUD, according to some embodiments of the invention.

Employing LAE Superimposition for Military practice. Employing the described method and apparatus for military practice would result in improved situational and navigational awareness particularly when moving army units over enemy or unrecognized territories and even more essential when stirring at night. The superimposition and display of LAE elements such as friendly forces or suspected enemy units may prove to be life saving. Command and Control (C2) use tactical computers which function very similar to commercial navigation devices (in the aspect of navigation). The C2 devices suffer from the same problems as commercial devices. The driver needs to synchronies with the digital mapping source presented on the screen too frequently, which takes a lot of time and when there is Fighting out side it could be even more dangerous and life risking. Referring now to FIG. 9 in more detail, the Fov Matrix 25 reflects designated stirring route—41a and LAE—41b as perceived from the TC-Tactical Computer (command & control device). The TC also delivered list of LAE elements which some are friendly forces—41c and logistic supply post—41e (the final destination of the trip). The remaining elements which appear on the list are enemy forces such as—41d, whom observe the vehicle's progress from above. As could be viewed from the diagram, superimposing necessary operational data which is placed accurately over vehicle closer and distant surroundings enhances drastically navigation and situational awareness of combat vehicles. Hence, reducing loses in battlefield and outscores in training and exercises.

Figure 10A:
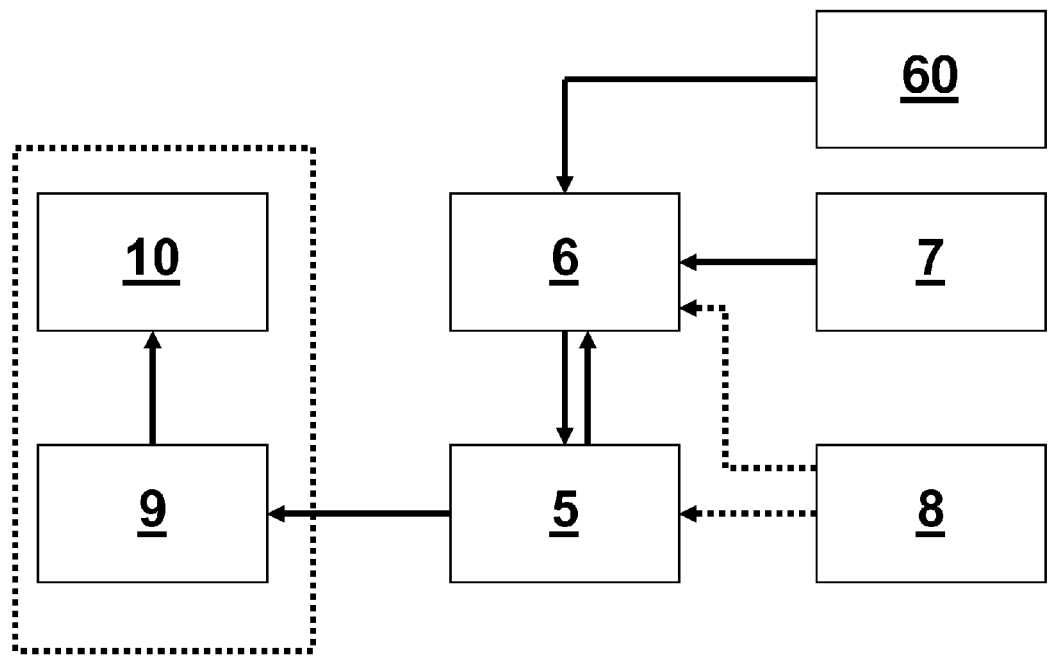
FIG. 10A presents a schematic example of a Navigation system, according to some embodiments of the invention.

Overall Apparatus Description and Optional Implementations. FIG. 10A presents visual scheme of typical apparatus implementation. FIGS. 10B-10F visualizes additional possible implementations of described apparatus. FIGS. 10B-10F show the major components of the apparatus embodying the key principals of the invention. For better understanding, dashed lines mean components that could be grouped together, in same computer or system. Thick solid arrows between boxes mean some form of direct data communication between two components, while dashed arrows denote optional or remote communication form between two components (will be explicitly specified for each individual scheme when depicted). The apparatus and described method could be implemented in some form of software configuration either as a stand alone component or enclosed as a code segment in other software application as depicted next. Referring now to FIG. 10A with more detail, the next components are presented: A component performing described method of present invention will be addressed as the "apparatus" 5 from further on. The apparatus is responsible for performing the describe method steps (Identification, Projection and Superimposition) functionality. The apparatus 5 obtains a form of local communication with Built-in navigation system 6 which might be on-board computer which the driver can insert into destination address or routes for getting instructions either graphically on a screen/windshield or vocally. As could be understood from the scheme, apparatus 5 could be aggregated with the navigation system 6 on the same computer by some kind of software formation as known in related art. The apparatus 5 is obtaining also a data link with the heads up display (HUD) and more specifically with the projection unit 9 which is connected to the combiner 10. The connection between the apparatus 5 and Projection Unit 9 could be standard LAN (local area network) or short range such as Wireless/Bluetooth for displaying LAE and DDA superimposition elements. The navigation system 6 performs local communication with the apparatus 5 for delivering LAE types and list of turn-off for DDA Superimposition (such as LAE) and operational instructions (switch on/off the apparatus display). The navigation system 6 performs communication also with storage device 60 which inputs and retrieves digital mapping material later used by the apparatus. Most of storage devices in vehicles are of the type CD/DVD/Flash drive and could be loaded/updated with digital mapping material by user. It is also possible that the on-board computer 6 could also store GIS information what mostly depends on its memory volume. The navigation system might obtain data link with the vehicle sensors such as odometer, accelerators and gyroscopes, whom produce telemetry such as vehicle angles and orientation (roll & pitch). That optional link could produce better performance and accuracy for LAE and DDA superimposition and improved safety. The last data link obtained by navigation system 6 is with the GPS or similar position locator, the connection comprised from dashed line because the GPS could be optionally connected directly to the apparatus 5 as viewed in the scheme for getting location more efficiently.

Apparatus Configuration and Calibration. The apparatus Calibration (mostly regarding the Fov Matrix Calibration) should be performed before first use of the apparatus most likely at the pre-market stage (when the vehicle is still on the production line) but not necessarily. The apparatus range and other superimposition parameters could be configured at any time by the driver) but preferably initial configuration should be obtained by the navigation system vendor representatives. The digital mapping material (two/three-dimensional Map, LAE, DTM and DSM) should be stored in the CD/DVD Flash drive or on-board computer before using the apparatus in designated district.

Figure 10B:
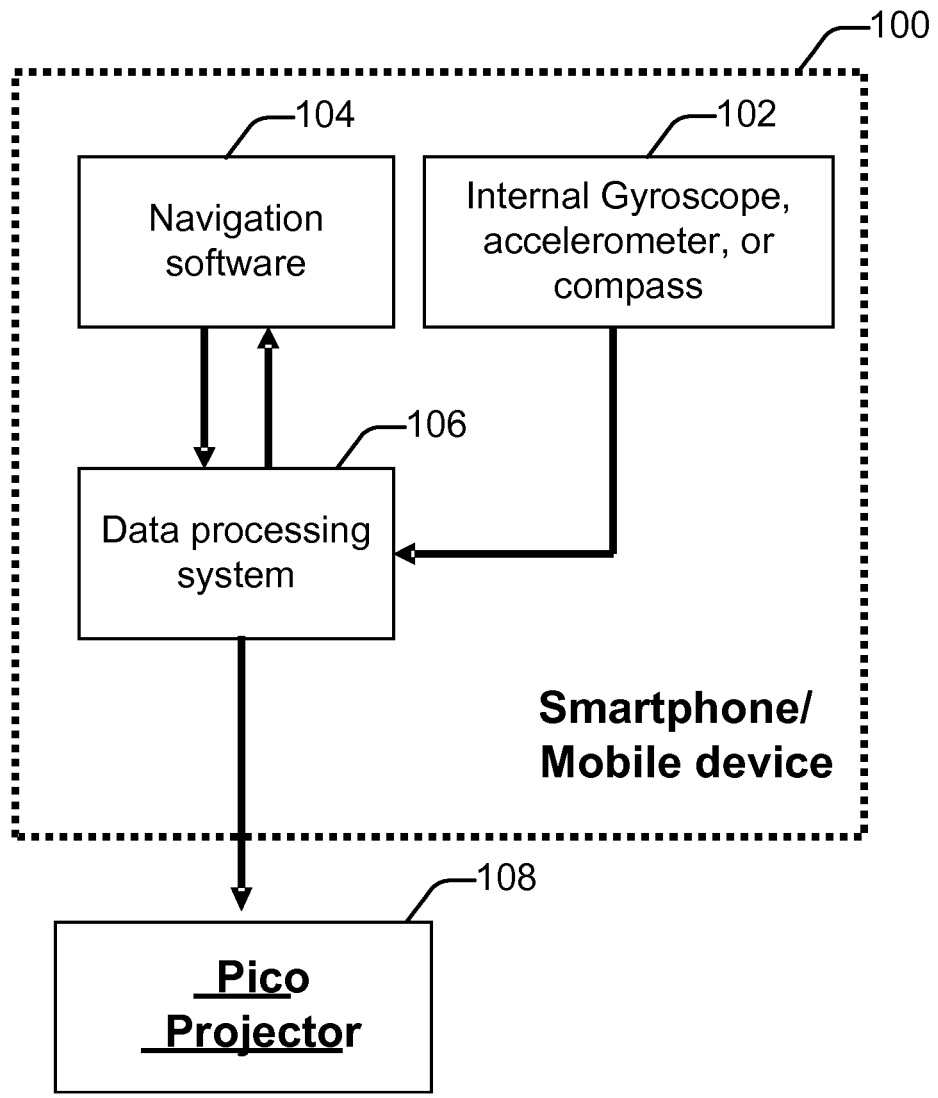
FIG. 10B presents a schematic example of a Mobile device such as PND/PDA/Cellular, or a Smartphone with Mobile PICO Projector deployment, according to some embodiments of the invention.

Apparatus Implementation with Mobile Device. As mentioned above FIGS. 10B-10F visualizes other possible implementations of the described method and apparatus. Referring now to FIG. 10B there is shown a scheme of the apparatus implementation which comprises mobile device such as: PND (personal navigation device), PDA and Cellular device. The apparatus 5 is connected to the HUD components as depicted in FIG. 10A but this time its also obtains data link with mobile device 11 as viewed in the scheme, the apparatus could be aggregated with the mobile device 5 on the same device in a form of software design skills as known in related art. The mobile device usually contains also internal GPS antenna for position locating.

FIG. 10B shows an implementation consistent with an embodiment of the invention as a Smartphone/mobile phone device 100 containing an internal gyroscope 102, navigation software 104, and a data processing system 106. Smartphone/mobile phone device 100 may be in communication with a pico projector 108. Smartphone/mobile phone device 100 is provided with the same functionality as the built-in navigation device as explained above in connection with FIG. 10A and might also connected (USB1.0/2.0) to a CD/DVD drive for storing larger size digital mapping material.

Figure 10C:
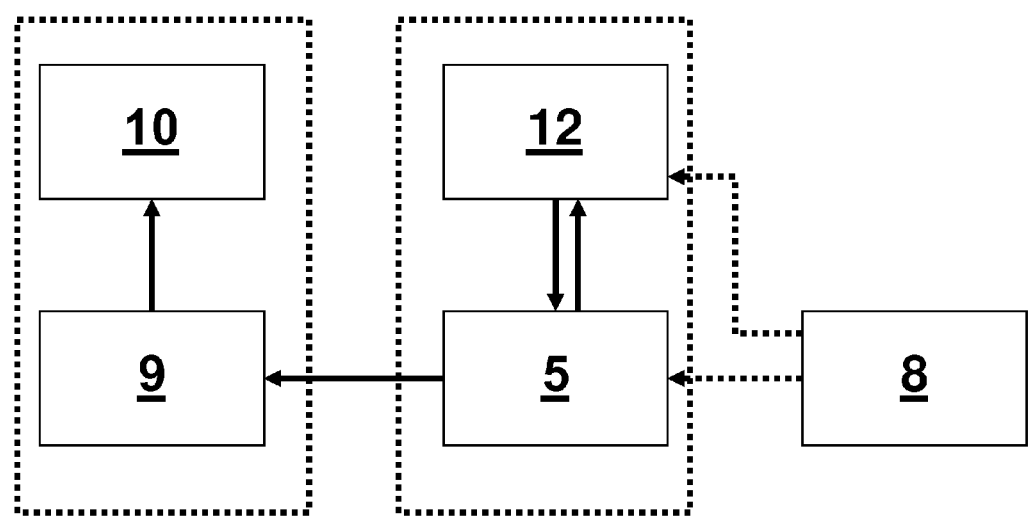
FIG. 10C presents a schematic example of a GIS system, according to some embodiments of the invention.

Apparatus Implementation with GIS Application. Referring now to FIG. 10C there is shown scheme of the apparatus implementation which comprises GIS (geographic information system) such as: Google earth and Microsoft virtual earth. That implementation could be useful for 4.times.4 navigation trips in unpaved or rural roads. The GIS application 12 could transfer the excursion's list of LAE predefined earlier or dynamically at real time. The apparatus 5 could track real time location by connecting to GPS or similar locator facilitating the apparatus to superimpose DDA and LAE (in this case LAE and other user input LAE) on the windshield. The range which the LAE elements will be imbued inside could be much longer because of landscape features. The apparatus could be aggregated with the GIS application 12 on the same on-board computer and form some kind of software configuration as known in related art. In that case, the apparatus could be connected wireless or by other short range communication with the HUD device. Additionally, digital mapping storage could be stored on the same computer. If the apparatus is grouped with GIS application 12 than the GPS device could be connected directly to the GIS application (as applied by Google Earth) and the location could be transferred to the apparatus by a data link between GIS and the apparatus.

Figure 10D:
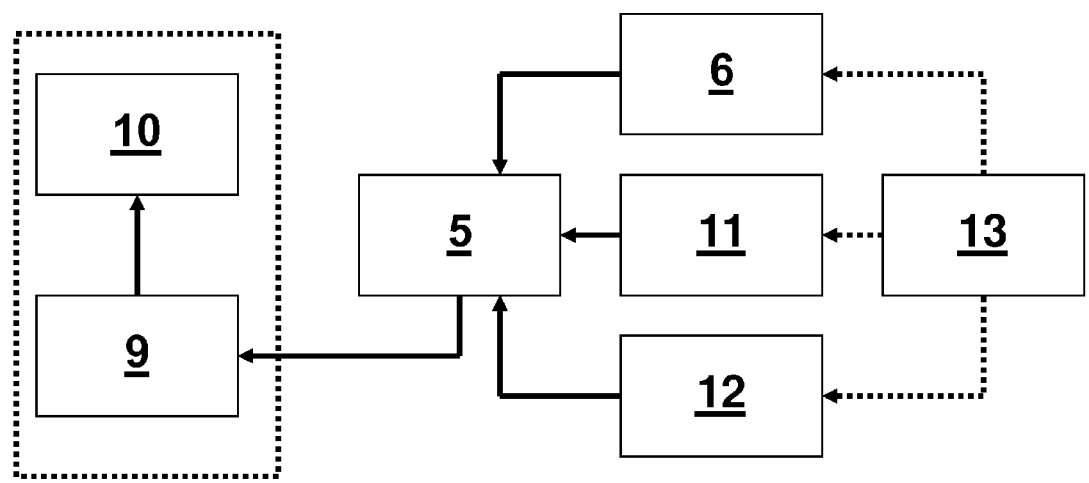
FIG. 10D presents a schematic example of Web Server/Internet, according to some embodiments of the invention.

Apparatus Implementation with Web Connectivity. Referring now to FIG. 10D, other possible extension of the apparatus implementation would be connecting it simultaneously with a web server (or other Internet component) 13 and one other from navigation devices mentioned earlier: built in navigation system 6, mobile device 11 or GIS application 12. This extended implementation could benefit in many ways such as be wired to online web content, traffic updates, municipal reports about city work and on-line events (entrainment, cultural shows etc) which take place close to vehicle location. The navigation device (either one of—6, 11 and 12) could be connected to the web by constricting known form of web connectivity such as Wimax and Cellular. The LAE elements could be transferred from web server to the navigation device and stored as LAE to be displayed in the relevant information layer and later selected by the driver for display over HUD.

Figure 10E:
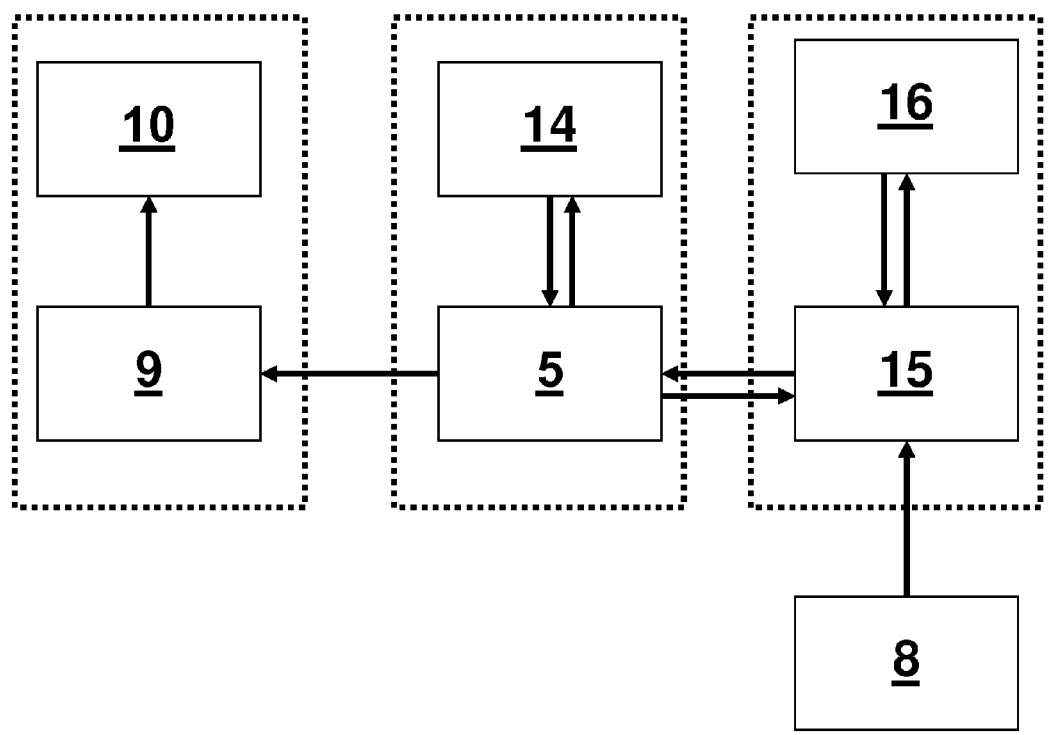
FIG. 10E presents a schematic example of optional implementations which imbues a safety system such as—collision avoidance system (CAS), according to some embodiments of the invention.
Figure 10F:
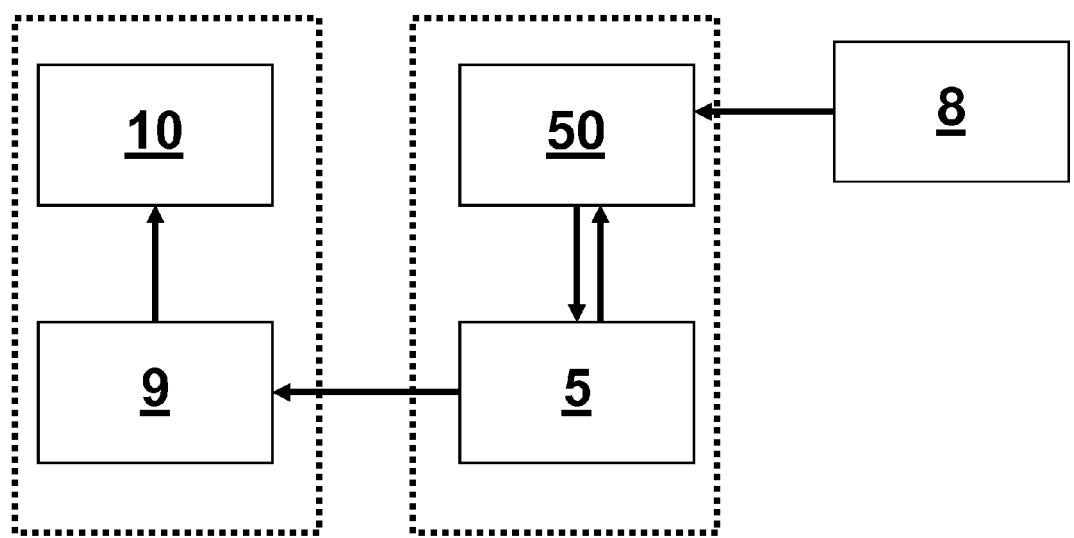
FIG. 10F is a view of an optional implementation which imbues a C2 system for military usage, according to some embodiments of the invention.

Apparatus Implementation with Collision Avoidance System (CAS). Referring now to FIG. 10E, the apparatus 5 could be integrated in some form with on-board processor (also computer) employing CAS application 15. Integrating both components would enable enhanced CAS performance and improved user/driver interface. That could be performed by fusing landscape features extracted by the apparatus 5 with vehicle's environment segmentation performed by the CAS 15. Data fusion would gain much better location/situation awareness which eventually would result in optimal planning of the escape track when needed. Nevertheless, when the escape track is obtained the apparatus could superimpose it on the windshield using HUD device in a manner that would ease the driver in tracking it. Referring now to FIG. 10E in more detail, the apparatus is connected to the HUD device in similar way which was described in previous schemes. The apparatus 5 could be aggregated with a navigation device 14 which has a digital mapping storage (or optionally connection to storage drive) the apparatus should form some kind of local communication with the CAS application 15 which is expected to communicate also with some kind of electronic sensor 16 (Radar, Image capture camera or Laser). Location locator 8 could be connected to the CAS or alternatively to the navigation device 14.

Apparatus Implementation for Military Practice Apart from implementing the apparatus for commercial use as depicted in former schemes, FIG. 10E represents scheme of implemented apparatus for military practice either for training or operational. The apparatus 5 forms local communication with the Tactical Computer 50 (TC). The two components could also be aggregated together on the same computer. The TC performs all the operational tasks while the apparatus facilitate superimposition of operational military LAE and DDA elements when necessary over the platform windshield or other reflecting substances assembled on the platform. The location locator 8 is connected to TC 50 in some form of communication as known in related art. Configuration and calibration of apparatus 5 might be different from similar processes for industrial vehicle manufacturers.

Advantageously, the current invention does not necessarily include hardware for measuring parameters of the driver's head. As the functionality does not require high definition data concerning the head, the system only roughly estimates the resting position of the head, in order to orient the projection around the middle of the driver's field of view. For example, head position may be estimated with an accuracy of 10° in the horizontal axis and 20° in the vertical axis. The system further utilizes the circumstances that projecting an image on a 2D surface (the vehicle's windshield) is simpler than calculating a 3D image. Moreover, in case the head is inclined in a large angle, the system may assume that the driver is at the moment not interested in what happens in front of the vehicle, so that the projection may be left un-updated.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method comprising:
generating a three dimensional (3D) model of a real world scene within a specified radius from a vehicle, based on a digital mapping source of the scene;
associating one or more positions in the 3D model with respective location aware entities (LAE);
estimating a current view direction of a viewer in the vehicle; and
superimposing three-dimensional graphic symbolic indicators respectively representing the LAEs onto a windshield of the vehicle in specified positions selected according to the estimated current view direction of the viewer such that the viewer, the symbolic graphic indicator on the windshield, and the position of the LAE in the 3D model are substantially on a common line of sight of the viewer, wherein the three-dimensional symbolic graphic indicators comprise at least one three-dimensional direction arrow, wherein the arrows are superimposed on the windshield only some of the time, when considered needed by the viewer to identify a desired turn of the vehicle.

2. The method according to claim 1, wherein the direction arrow's direction is repeatedly updated based on the vehicle's current position and on a calculated route between the vehicle and a desired destination.

3. The method according to claim 1, further comprising updating at least one of: the viewer's viewing angle, the viewer's distance from the screen, and the vehicle's position and angle within the scene, to yield an updated 3D model and updated position of the at least one graphic indicator.

4. A system comprising:
a processor; and
a projector configured to:
generate a three dimensional (3D) model of a scene within a specified radius from a vehicle, based on a digital mapping source of the scene and associate one or more positions in the 3D model with respective location aware entities (LAE);
estimate a current view direction of a viewer in the vehicle;
superimpose three-dimensional graphic symbolic indicators respectively representing the LAEs onto a windshield of the vehicle, in a two dimensional (2D) specified projection area selected according to the estimated current view direction of the viewer,
such that the viewer, the graphic indicator on the windshield, and the position of the LAE in the 3D model are substantially on a common line of sight of the viewer,
wherein the three-dimensional symbolic graphic indicators comprise at least one three-dimensional direction arrow,
wherein the arrows are superimposed on the windshield only some of the time, when considered needed by the viewer to identify a desired turn of the vehicle.

5. The system according to claim 4, wherein the direction arrow's direction is repeatedly updated based on the vehicle's current position and on a calculated route between the vehicle and a desired direction.

6. The system according to claim 4, wherein the processor is further configured to update at least one of: the viewer's viewing angle, the viewer's distance from the screen, and the vehicle's position and angle within the scene, to yield an updated 3D model and updated position of the at least one three-dimensional graphic indicator.

7. The system according to claim 6, wherein at least some of the update is estimated by the processor.

8. The system according to claim 4, wherein, when a specified LAE is obscured by an element contained within the scene and closer to the viewer, the position of the graphic indicator associated withh the specified LAE is adjusted by the processor to a specified distance from a LAE on the screen substantially on a common line with the viewer and the specified LAE.

9. A computer program product, the computer program product comprising:
a non-transitory computer readable storage medium having a computer readable program embodied therewith, the computer readable program comprising:
computer readable code configured to generate a three dimensional (3D) model of a real world scene within a specified radius from a vehicle, based on a digital mapping source of the scene;
computer readable cock configured to associate one or more positions in the 3D model with respective location aware entities (LAE);
computer readable code configured to estimate a current view direction of a viewer in the vehicle; and
computer readable code configured to calculate a position on a windshield of the vehicle of at least one three-dimensional symbolic graphic indicator associated with at least one LAE,
wherein the calculation is based on: the estimated current view direction of the viewer, such that the graphic indicator, and the LAE are substantially on a common line of sight of the viewer,
wherein the three-dimensional symbolic graphic indicator comprises at least one three-dimensional direction arrow,
wherein the arrows are superimposed on the windshield only some of the time, when considered needed by the viewer to identify a desired turn of the vehicle.

10. The computer program product according to claim 9, and also comprising computer readable code configured to provide a three-dimensional direction arrow for directing the viewer to the LAE, and wherein the position of the direction arrow on the screen is calculated based on at least one of location, angle, and direction of a turning point within the scene in association with which a turn has to be made in order to reach the LAE.

11. The computer program product, according to claim 10, Wherein the direction arrow's direction is repeatedly updated based on the vehicle's current position and on a calculated route between the vehicle and the LAE.

12. The computer program product according to claim 9, further comprising computer readable code configured to update at least one of the viewer's viewing angle, the viewer's distance from the screen, and the vehicle's position and angle within the scene, to yield an updated 3D model and updated position of the at least one graphic indicator.

13. The method of claim 1, wherein superimposing three-dimensional graphic symbolic indicators respectively representing the LAEs comprises superimposing based on a distance of the viewer from the windshield.

14. The method of claim 1, wherein superimposing three-dimensional graphic symbolic indicators respectively representing the LAEs comprises superimposing based on a geometry of the windshield.

15. The method according to claim 1, wherein the symbolic graphic indicator has a feature dependent on a distance from the viewer to the position of the respective LAE in the 3D model.

16. The method according to claim 1, comprising periodically repeating the superimposing according to a current location of the vehicle.

17. The method according to claim 1, comprising periodically repeating the superimposing according to a current view direction of the viewer.

18. A computer implemented method, comprising:
generating a three dimensional (3D) model of a real world scene within a specified radius from a vehicle, based on a digital mapping source of the scene;
associating one or more positions in the 3D model with respective location aware entities (LAE);
estimating a current view direction of a viewer in the vehicle; and superimposing three-dimensional graphic symbolic indicators respectively representing the LAEs onto a windshield of the vehicle in specified positions selected according to the estimated current view direction of the viewer such that the viewer, the symbolic graphic indicator on the windshield, and the position of the LAE in the 3D model are substantially on a common line of sight of the viewer, wherein the three-dimensional symbolic graphic indicators comprise at least one three-dimensional direction arrow, wherein the arrows are placed in a manner identifying a calculated escape track.

19. The method according to claim 18, wherein the arrows are superimposed on the windshield only some of the time, when considered needed by the viewer to identify a desired turn of the vehicle.

20. The method of claim 1, wherein the generating of the three dimensional (3D) model is performed without using a camera on the vehicle.

21. The method according to claim 1, comprising detecting whether terrain or surface features occlude a line of sight from the viewer to an LAE and adjusting the display of the symbolic graphic indicator responsively to whether the identified object is occluded.

22. The method of claim 1, comprising:
detecting LAEs in the 3D model occluded by terrain or other surface features from the viewer;
selecting for the occluded LAEs, adjusted locations in the 3D model, which are visible by the viewer; and
superimposing graphic symbolic indicators of the occluded LAEs based on the adjusted visible locations.

23. The method of claim 1, comprising:
detecting LAEs in the 3D model occluded by terrain or other surface features from the viewer; and
wherein the superimposing comprises superimposing graphic symbolic indicators also for LAEs in positions occluded by terrain or other surface features from the viewer.

* * * * *